(12) United States Patent
Wang et al.

(10) Patent No.: US 9,678,992 B2
(45) Date of Patent: Jun. 13, 2017

(54) TEXT TO IMAGE TRANSLATION

(75) Inventors: Xin-Jing Wang, Beijing (CN); Lei Zhang, Beijing (CN); Wei-Ying Ma, Beijing (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/110,282

(22) Filed: May 18, 2011

(65) Prior Publication Data

US 2012/0296897 A1 Nov. 22, 2012

(51) Int. Cl.
*G06F 17/30* (2006.01)
*G06F 15/18* (2006.01)

(52) U.S. Cl.
CPC .. *G06F 17/30265* (2013.01); *G06F 17/30247* (2013.01); *G06F 15/18* (2013.01)

(58) Field of Classification Search
CPC ......... G06F 17/30265; G06F 17/30268; G06F 17/30244; G06F 17/30247; G06F 15/18
See application file for complete search history.

(56) References Cited

U.S. PATENT DOCUMENTS

| | | | |
|---|---|---|---|
| 5,852,823 A | 12/1998 | De Bonet | |
| 5,893,095 A | 4/1999 | Jain et al. | |
| 5,913,205 A | 6/1999 | Jain et al. | |
| 6,005,973 A | 12/1999 | Seybold et al. | |
| 6,128,446 A | 10/2000 | Schrock et al. | |
| 6,397,213 B1 | 5/2002 | Cullen et al. | |
| 6,480,841 B1 | 11/2002 | Higashio et al. | |
| 6,523,026 B1* | 2/2003 | Gillis | |
| 6,804,659 B1 | 10/2004 | Graham et al. | |
| 6,804,684 B2 | 10/2004 | Stubler et al. | |
| 6,970,860 B1 | 11/2005 | Liu et al. | |
| 7,010,751 B2 | 3/2006 | Shneiderman | |
| 7,099,860 B1* | 8/2006 | Liu et al. | |

(Continued)

FOREIGN PATENT DOCUMENTS

| | | |
|---|---|---|
| EP | 1304625 | 4/2003 |
| JP | 1196176 | 4/1999 |

(Continued)

OTHER PUBLICATIONS

"Detection of Near-duplicate Images for Web Search," by Foo et al., IN: CIVR'07 (2007). Available at: ACM.*

(Continued)

*Primary Examiner* — Daniel Kinsaul
(74) *Attorney, Agent, or Firm* — Lee & Hayes, PLLC

(57) ABSTRACT

Techniques are described for online real time text to image translation suitable for virtually any submitted query. Semantic classes and associated analogous items for each of the semantic classes are determined for the submitted query. One or more requests are formulated that are associated with analogous items. The requests are used to obtain web based images and associated surrounding text. The web based images are used to obtain associated near-duplicate images. The surrounding text of images is analyzed to create high-quality text associated with each semantic class of the submitted query. One or more query dependent classifiers are trained online in real time to remove noisy images. A scoring function is used to score the images. The images with the highest score are returned as a query response.

19 Claims, 4 Drawing Sheets

(56) References Cited

U.S. PATENT DOCUMENTS

| | | | |
|---|---|---|---|
| 7,136,876 B1 | 11/2006 | Adar et al. | |
| 7,506,246 B2 | 3/2009 | Hollander et al. | |
| 7,529,411 B2 | 5/2009 | Haupt et al. | |
| 7,624,337 B2 | 11/2009 | Sull et al. | |
| 7,739,304 B2 | 6/2010 | Naaman et al. | |
| 7,961,986 B1 | 6/2011 | Jing et al. | |
| 7,971,150 B2 | 6/2011 | Raskutti et al. | |
| 8,023,702 B2 | 9/2011 | Momosaki et al. | |
| 8,112,702 B2 | 2/2012 | Badoiu et al. | |
| 8,185,526 B2 | 5/2012 | Wen et al. | |
| 8,208,764 B2 | 6/2012 | Guckenberger | |
| 8,234,277 B2 * | 7/2012 | Thong et al. | 707/736 |
| 8,340,498 B1 | 12/2012 | Gill et al. | |
| 8,391,618 B1 * | 3/2013 | Chuang et al. | 382/224 |
| 8,429,173 B1 | 4/2013 | Rosenberg et al. | |
| 8,442,940 B1 * | 5/2013 | Faletti et al. | 707/610 |
| 8,478,052 B1 | 7/2013 | Yee et al. | |
| 8,510,308 B1 | 8/2013 | Pasca et al. | |
| 8,792,728 B2 | 7/2014 | Tang et al. | |
| 2002/0038299 A1 | 3/2002 | Zernik et al. | |
| 2002/0087538 A1 | 7/2002 | Abdel-Mottaleb et al. | |
| 2002/0138478 A1 * | 9/2002 | Schwartz et al. | 707/3 |
| 2002/0184196 A1 | 12/2002 | Lehmeier et al. | |
| 2002/0188602 A1 | 12/2002 | Stubler et al. | |
| 2003/0018631 A1 | 1/2003 | Lipson et al. | |
| 2003/0195883 A1 | 10/2003 | Mojsilovic et al. | |
| 2004/0003351 A1 | 1/2004 | Sommerer et al. | |
| 2004/0021780 A1 | 2/2004 | Kogan | |
| 2004/0070678 A1 | 4/2004 | Toyama et al. | |
| 2004/0133418 A1 * | 7/2004 | Turcato | G06F 17/241 704/9 |
| 2004/0213553 A1 | 10/2004 | Nagahashi | |
| 2004/0225686 A1 | 11/2004 | Li et al. | |
| 2004/0236830 A1 | 11/2004 | Nelson et al. | |
| 2005/0010602 A1 | 1/2005 | Loui et al. | |
| 2005/0114325 A1 | 5/2005 | Liu et al. | |
| 2005/0182777 A1 | 8/2005 | Block et al. | |
| 2005/0210393 A1 | 9/2005 | Maeng | |
| 2005/0228657 A1 * | 10/2005 | Chou et al. | 704/225 |
| 2005/0278379 A1 | 12/2005 | Nakazawa | |
| 2006/0143176 A1 | 6/2006 | Mojsilovic et al. | |
| 2006/0179453 A1 | 8/2006 | Kadie et al. | |
| 2006/0195321 A1 | 8/2006 | Deligne et al. | |
| 2006/0242013 A1 | 10/2006 | Agarwal et al. | |
| 2006/0242147 A1 | 10/2006 | Gehrking et al. | |
| 2006/0264209 A1 | 11/2006 | Atkinson et al. | |
| 2007/0005571 A1 | 1/2007 | Brewer et al. | |
| 2007/0038601 A1 | 2/2007 | Guha | |
| 2007/0061146 A1 * | 3/2007 | Jaramillo et al. | 704/270 |
| 2007/0078846 A1 * | 4/2007 | Gulli | G06F 17/30247 |
| 2007/0106685 A1 | 5/2007 | Houh et al. | |
| 2007/0112844 A1 | 5/2007 | Tribble et al. | |
| 2007/0156770 A1 | 7/2007 | Espelien | |
| 2007/0160275 A1 | 7/2007 | Sathyanarayana | |
| 2007/0237426 A1 * | 10/2007 | Xie | G06F 17/30259 382/305 |
| 2007/0240060 A1 | 10/2007 | Berenbach et al. | |
| 2007/0250901 A1 | 10/2007 | McIntire et al. | |
| 2007/0255618 A1 | 11/2007 | Meerbergen et al. | |
| 2007/0266001 A1 | 11/2007 | Williams et al. | |
| 2007/0271226 A1 | 11/2007 | Zhang et al. | |
| 2007/0288453 A1 | 12/2007 | Podilchuk | |
| 2007/0293265 A1 | 12/2007 | Fei et al. | |
| 2007/0294294 A1 | 12/2007 | Aarnio et al. | |
| 2008/0004953 A1 | 1/2008 | Ma et al. | |
| 2008/0046240 A1 | 2/2008 | Gorodyansky et al. | |
| 2008/0215583 A1 | 9/2008 | Gunawardena et al. | |
| 2008/0235724 A1 | 9/2008 | Sassenscheidt et al. | |
| 2008/0281915 A1 | 11/2008 | Elad et al. | |
| 2008/0313541 A1 | 12/2008 | Shafton et al. | |
| 2008/0319844 A1 | 12/2008 | Hua et al. | |
| 2009/0012869 A1 | 1/2009 | Henkin et al. | |
| 2009/0144609 A1 | 6/2009 | Liang et al. | |
| 2009/0148071 A1 | 6/2009 | Ohwa et al. | |
| 2009/0171929 A1 * | 7/2009 | Jing | G06F 17/3064 |
| 2009/0172030 A1 | 7/2009 | Schiff et al. | |
| 2009/0187825 A1 | 7/2009 | Sandquist et al. | |
| 2009/0196464 A1 | 8/2009 | Dimitrova et al. | |
| 2009/0196510 A1 | 8/2009 | Gokturk et al. | |
| 2009/0208097 A1 | 8/2009 | Husseini et al. | |
| 2009/0249185 A1 | 10/2009 | Datar et al. | |
| 2009/0290764 A1 | 11/2009 | Fiebrink et al. | |
| 2009/0300475 A1 | 12/2009 | Fink et al. | |
| 2009/0313239 A1 | 12/2009 | Wen et al. | |
| 2009/0319883 A1 | 12/2009 | Mei et al. | |
| 2010/0057694 A1 | 3/2010 | Kunjithapatham et al. | |
| 2010/0067745 A1 | 3/2010 | Kovtun et al. | |
| 2010/0074528 A1 * | 3/2010 | Hu et al. | 382/190 |
| 2010/0076923 A1 | 3/2010 | Hua et al. | |
| 2010/0076968 A1 | 3/2010 | Boyns et al. | |
| 2010/0145803 A1 | 6/2010 | Kobani | |
| 2010/0177956 A1 | 7/2010 | Cooper et al. | |
| 2010/0205202 A1 | 8/2010 | Yang et al. | |
| 2010/0260426 A1 * | 10/2010 | Huang et al. | 382/218 |
| 2010/0278453 A1 | 11/2010 | King | |
| 2010/0293174 A1 | 11/2010 | Bennett et al. | |
| 2010/0303342 A1 * | 12/2010 | Berg | G06F 17/30247 382/155 |
| 2010/0325015 A1 | 12/2010 | Westphal | |
| 2011/0038512 A1 | 2/2011 | Petrou et al. | |
| 2011/0085739 A1 * | 4/2011 | Zhang et al. | 382/218 |
| 2011/0106782 A1 * | 5/2011 | Ke | G06F 17/30256 707/706 |
| 2011/0116690 A1 | 5/2011 | Ross et al. | |
| 2011/0122255 A1 | 5/2011 | Haritaoglu | |
| 2011/0123115 A1 | 5/2011 | Lee et al. | |
| 2011/0173141 A1 | 7/2011 | Campbell et al. | |
| 2012/0045134 A1 * | 2/2012 | Perronnin | G06K 9/6234 382/197 |
| 2013/0046761 A1 | 2/2013 | Soderberg et al. | |
| 2013/0282712 A1 * | 10/2013 | Brandt | 707/731 |
| 2014/0032529 A1 * | 1/2014 | Chang | 707/722 |
| 2015/0082173 A1 | 3/2015 | El-Saban et al. | |

FOREIGN PATENT DOCUMENTS

| | | |
|---|---|---|
| JP | 2003186889 | 7/2003 |
| JP | 2004234228 | 8/2004 |
| JP | 2005011079 | 1/2005 |
| JP | 2005352782 | 12/2005 |
| KR | 20040054901 | 6/2004 |
| RU | 2193797 | 11/2002 |
| WO | WO2005008519 | 1/2005 |
| WO | WO2006002745 | 1/2006 |

OTHER PUBLICATIONS

"A comparative study of TF*IDF, LSI and multi-words for text classification," by Zhang et al. IN: Expert Systems with Applications 38 (2011). pp. 2758-2765. Available at: Elsevier.n.*

"AnnoSearch: Image Auto-Annotation by Search," by Wang et al. IN: Comp. Vision & Pattern Recog. vol. 2 (2006). Available at: IEEE.*

"Large-Scale Duplicate Detection for Web Image Search," by Wang et al. IN: Multimedia and Expo (2006). Available at: IEEE.*

"Supervised Learning of Semantic Classes for Image Annotation and Retrieval," by Carneiro et al. IN: IEEE Trans. Pattern Analysis & Machine Intel. (2007). Available at: IEEE.*

"Improving Web Image Search Results Using Query-relative Classifiers," by Krapac et al. IN: Comp. Vision & Pattern Recognition (Jun. 13-18, 2010). Available at: IEEE.*

Office Action for U.S. Appl. No. 12/790,761, mailed on Mar. 20, 2012, Motaz Ahmed El-Saban, "Real-Time Annotation and Enrichment of Captured Video", 15 pgs.

Office Action for U.S. Appl. No. 12/563,955, mailed on Oct. 13, 2011, Xin-Jing Wang, "Interest Learning from an Image Collection for Advertising", 22 pgs.

"Become an Online Image Detective with TinEye (groovyReview)", retrieved on Aug. 3, 2010 at <<http://www.groovypost.com/howto/groovyreview/become-online-image-detective-tineye-review/>>, groovyPost.com, Jan. 18 2010, pp. 1-11.

(56) References Cited

OTHER PUBLICATIONS

Chang, Lin, "LIBSVM: a Library for Support Vector Machines", retrieved on Apr. 12, 2010 at <<http://http://www.csie.ntu.edu.tw/~cjlin/papers/libsvm.pdf>>, National Taiwan University Technical Report, Computer Science and Information Engineering, 2001-2004, pp. 1-30.(software available at http://www.csie.ntu.edu.tw/~cjlin/libsvm).
Deschacht, et al., "Text Analysis for Automatic Image Annotation", retrieved on Aug. 2, 2010 at <<http://class.inrialpes.fr/pub/106-deschacht-acl07.pdf>>, Meeting of the Association for Computational Linguistics, Prague, Jun. 2007, pp. 1-8.
Fellbaum (ed.), "WordNet: An Electronic Lexical Database", retrieved on Apr. 16, 2010 at <<http://www.dsoergel.com/cv/C19.pdf>>, MIT Press, Cambridge, MA, May 1998, pp. 1-445.
Fergus et al., "A Visual Category Filter for Google Images," Computer Vision—\ ECCV, 2004, Lecture Notes in Computer Science, 2004, vol. 3021/2004, 14 pages.
Flickr.http://www.flickr.com/.
Foo, et al., "Detection of Near-duplicate Images for Web Search", retrieved on Apr. 16, 2010 at <<http://www.cs.rmit.edu.au/~jufoo/pdfs/CIVRO7_Foo.pdf>>, ACM, Proceedings of the 6th International Conference on Image and Video Retrieval (CIVR), Amsterdam, The Netherlands, Feb. 2007, pp. 557-564.
Grcar, et al., "User Profiling for Interest-Focused Browsing History", Oct. 2005, retrieved on Sep. 18, 2009 at http://eprints.pascal-network.org/archive/00001202/01/GrcarBrowsingHistorySiKDD2005.pdf, 4 pgs.
Hays, et al., "Scene Completion Using Millions of Photographs", retrieved on Apr. 16, 2010 at <<http://delivery.acm.org/10.1145/1280000/1276382/a4-hays.pdf?key1=1276382&key2=4013141721&coll=GUIDE&dl=GUIDE&CFID=84511483&CFTOKEN=74352152>>, ACM, Transactions on Graphics, vol. 26, No. 3, Article 4, Jul. 2007, pp. 1-8.
Hua, et al. "Internet Multimedia Search and Mining"—Published date: Jan. 27, 2010 http://research.microsoft.com/en-us/um/people/xshua/imsm/ebook/pdf/16.pdf, 30 pages.
Huang, et al., "Image Indexing Using Color Correlograms", Proc 1997 Conf on Computer Vision and Pattern Recognition (CVPR'97), Jun. 1997, 7 pages.
Jeon, et al., "Automatic Image Annotation and Retrieval Using Cross-Media Relevance Models", Proc 26th Annual Intl ACM SIGIR Conf on Research and Development in Information Retrieval, Jul. and Aug. 2003, available at http://ciir.cs.umass.edu/pubfiles/mm-41.pdf, 8 pgs.
Jeon, et al., "Using Maximum Entropy for Automatic Image Annotation", 3rd Intl Conf Image and Video Retrieval, CIVR Jul. 2004, Proceedings Series: Lecture Notes in Computer Science, 3115, available at http://ciir.cs.umass.edu/pubfiles/mm-355.pdf, 9 pgs.
Joshi, et al. "Keyword Generation for Search Engine Advertising" In Proc. of the 6th IEEE Int. Cong. on Data Mining-Workshops, Dec. 2006, 24 pages.
Kennedy, et al., "Generating Diverse and Representative Image Search Results for Landmarks", retrieved on May 26, 2010 at <<http://www.google.co.in/url?sa=t&source=web&ct=res&cd=6&ved=0CB8QFjAF&url=http%3A%2F%2Fciteseerx.ist.psu.edu%2Fviewdoc%2Fdownload%3Fdoi%3D10.1.1.119.1522%26rep%3Drep1%26type%3Dpdf&rct=j&q=generating+web+image+cluster&ei=A0irS6LUMtO6jAeJofjWDw&usg=AFQjCNEFwCBRBWDdZlkpXuFUclS1-n601g>>, ACM, Proceedings of the 17th Int'l Conf. on World Wide Web (2008).
Lin et al., "Video Collaborative Annotation Forum: Establishing Ground-Truth Labels on Large Multimedia Datasets", IBM T.J. Watson research Center, 2003, pp. 1-19.
Mei, et al., "Contextual In-Image Advertising", retrieved on Oct. 27, 2009 at <<http://www.cs.clemson.edu/~jzwang/0901863/mm2008/p439-mei.pdf>>, MM 2008, ACM, Oct. 2008, pp. 439-448.
Osman, et al., "Semantic Annotation and Retrieval of Image Collections", retrieved on Aug. 2, 2010 at <<http://www.scs-europe.net/conf/ecms2007/ecms2007-cd/ecms2007/ecms2007%20pdf/vv_0167.pdf>>, Proceedings European Conference on Modelling and Simulation (ECMS), 2007, pp. 1-6.
Satoh, et al., "Name-It: Naming and Detecting Faces in News Videos", retrieved on Aug. 2, 2010 at <<http://www.informedia.cs.cmu.edu/documents/nameit_IEEE-MM99.pdf>>, IEEE Computer Society, Multimedia, vol. 6, No. 1, 1999, pp. 22-35.
Strong, et al., "Organizing and Browsing Image Search Results based on Conceptual and Visual Similarities"Retrieved Date: Jan. 5, 2011 http://www.cs.mun.ca/~hoeber/download/2010_isvc_vibe_concept.pdf, 10 pages.
Torralba, et al., "80 million tiny images: a large dataset for non-parametric object and scene recognition", retrieved on Apr. 16, 2010 at <<http://people.csail.mit.edu/torralba/publications/80millionImages.pdf>>, IEEE Computer Society, Transactions on Pattern Analysis and Machine Intelligence, vol. 30, No. 11, Nov. 2008, pp. 1958-1970.
Tseng et al., "Video Summarization and Personalization for Pervasive Mobile Devices", IBM T.J. Watson Research Center, 2002, pp. 1-12.
Wang, et al., "AnnoSearch: Image Auto-Annotation by Search", Proc 2006 IEEE Computer Society Conf on Computer Vision and Pattern Recognition, Mar. 2006, , 8 pgs.
Wang, et al., "AnnoSearch: Image Auto-Annotation by Search", retrieved on Apr. 16, 2010 at <<http://research.microsoft.com/en-us/um/people/leizhang/paper/cvpr06_annosearch.pdf>> IEEE Computer Society, Proceedings of Conference on Computer Vision and Pattern Recognition (CVPR), vol. 2, 2006, pp. 1483-1490.
Wang, et al., "Large-Scale Duplicate Detection for Web Image Search", retrieved on Apr. 16, 2010 at <<http://www.cecs.uci.edu/~papers/icme06/pdfs/0000353.pdf>>, IEEE Conference on Multimedia and Expo (ICME), Toronto, Canada, Jul. 2006, pp. 353-356.
Yamamoto et al., "iVAS: Web-based Video Annotation System and its Applications", retrived at <<http://iswc2004.semanticweb.org/demos/29/paper.pdf>> on Apr. 17, 2010, pp. 1-4.
Translated Korean Office Action mailed Jun. 14, 2013 for Korean patent application No. 10-2008-7028292, a counterpart foreign application of U.S. Pat. No. 8,341,112, 7 pages.
Office action for U.S. Appl. No. 12/563,955, mailed on May 6, 2013, Wang et al., "Interest Learning from an Image Collection for Advertising ", 25 pages.
Office action for U.S. Appl. No. 12/790,761, mailed on Jun. 10, 2013, El-Saban et al., "Real-Time Annotation and Enrichment of Captured Video", 12 pages.
Office action for U.S. Appl. No. 12/790,772, mailed on Jun. 3, 2013, Wang et al., "Associating Media With Metadata of Near-Duplicates", 15 pages.
Chinese Office Action mailed Oct. 17, 2012 for Chinese patent application No. 200780017842.6, a counterpart foreign application of U.S. Appl. No. 11/419,368, 8 pages.
Office action for U.S. Appl. No. 12/942,284, mailed on Jan. 2, 2013, Zhang et al., "Building a Person Profile Database", 11 pages.
U.S. Appl. No. 13/110,282; "Text to Image Translation" Wang, et al., filed May 18, 2011, 46 pages.
Chinese Office Action mailed Feb. 5, 2013 for Chinese patent application No. 200780017842.6, a counterpart foreign application of U.S. Appl. No. 11/419,368, 7 pages.
Office action for U.S. Appl. No. 12/790,761, mailed on Feb. 24, 2013, El-Saban et al., "Real-Time Annotation and Enrichment of Captured Video", 12 pages.
Office action for U.S. Appl. No. 14/547,941, mailed on Jul. 31, 2015, El-Saban et al., "Real-Time Annotation and Enrichment of Captured Video", 9 pages.
Office action for U.S. Appl. No. 12/790,772, mailed on Aug. 14, 2015, Wang et al., "Associating Media With Metadata of Near-Duplicates", 22 pages.
Office action for U.S. Appl. No. 12/790,761, mailed on Feb. 6, 2014, El-Saban, et al., "Real-Time Annotation and Enrichment of Captured Video", 7 pages.
Office action for U.S. Appl. No. 12/563,955, mailed on Dec. 17, 2013, Wang, et al., "Interest Learning from an Image Collection for Advertising", 25 pages.

(56) References Cited

OTHER PUBLICATIONS

Office action for U.S. Appl. No. 12/790,772, mailed on Sep. 26, 2013, Wang, et al., "Associating Media With Metadata of Near-Duplicates", 20 pages.
Office action for U.S. Appl. No. 12/563,955, mailed on Aug. 23, 2013, Wang et al., "Interest Learning from an Image Collection for Advertising ", 25 pages.
Office action for U.S. Appl. No. 14/547,941 mailed on Nov. 3, 2015, El-Saban et al., "Real-Time Annotation and Enrichment of Captured Video", 10 pages.
Davis, et al., "From Context to Content: Leveraging Context to Infer Media Metadata", MM'04, Oct. 10-16, 2004, New York, NY, USA.
European Office Action mailed Mar. 9, 2016 for European Patent Application 07795180.4, a counterpart foreign application of U.S. Pat. No. 8,341,112, 7 pages.
Office action for U.S. Appl. No. 14/547,941, mailed on Apr. 11, 2016, El-Saban et al., "Real-Time Annotation and Enrichment of Captured Video", 10 pages.
Sarvas, et al., "Metadata Creation System for Mobile Images", MobiSys'04, Jun. 6-9, 2004, Boston, MA, USA.
Office action for U.S. Appl. No. 12/790,772, mailed on May 11, 2016, Wang et al., "Associating Media With Metadata of Near-Duplicates", 24 pages.
Ben-Haim, et al., "Improving Web-based Image Search via Content Based Clustering", in the Proceedings of the IEEE 2006 Conference on Computer Vision and Pattern Recognition Workshop, Jun. 17, 2006, 6 pages.
Berg et al., "It's All About the Data", in the Proceedings of the IEEE , Vo. 98, No. 8, Aug. 2010, pp. 1434-1452.
Merler et al., "Recognizing Groceries in situ Using in vitro Training Data", in the Proceedings of the 2007 IEEE Conference on Computer Vision and Pattern Recognition, Jun. 17, 2007, 8 pages.
Vang et al., "Buidling text features for object image classification", in the Proceeding of the 2009 IEEE Conference on Computer Vision and Pattern Recognition, Jun. 20, 2009, 8 pages.
Indian Office Action mailed Aug. 5, 2016 for Indian patent application No. 5844/CHENP/2008, a counterpart foreign application of U.S. Pat. No. 8,341,112, 8 pages.
European Office Action mailed Sep. 5, 2016 for European Patent Application 07795180.4, a counterpart foreign application of U.S. Pat. No. 8,341,112, 5 pages.
Office action for U.S. Appl. No. 12/790,772, mailed on Sep. 12, 2016, Wang, et al., "Associating Media With Metadata of Near-Duplicates", 21 pages.
Office action for U.S. Appl. No. 14/547,941, mailed on Sep. 21, 2016, Ei-Saban et al., "Real-Time Annotation and Enrichment of Captured Video", 12 pages.
"Auto-Generation of Topic Hierarchies for Web Images from Users' Perspectives" Available at http://portal.acm.org/citation.cfm?id=956969.
Translated Chinese Office Action mailed Jul. 6, 2011 for Chinese patent application No. 200780017842.6, a counterpart foreign application of U.S. Appl. No. 11/419,368.
Office Action for U.S. Appl. No. 11/419,368, mailed on Aug. 5, 2011, Lei Zhang, "Annotation by Search".
Translated Japanese Office Action mailed May 25, 2012 for Japanese patent application No. 2009-511113, a counterpart foreign application of U.S. Appl. No. 11/419,368, 8 pages.
Office Action for U.S. Appl. No. 12/790,761, mailed on Mar. 20, 2012, Motaz Ahmed Ei-Saban, "Real-Time and Enrichment of Captured Video", 15 pgs.
Chinese Office Action mailed Mar. 20, 2012 for Chinese patent application No. 200780017842.6, a counterpart foreign application of U.S. Appl. No. 11/419,368, 8 pages.
Office Action for U.S. Appl. No. 12/563,955, mailed on Mar. 15, 2012, Xin-Jing Wang, "Interest Learning from an Image Collection for Advertising", 23 pgs.
Office action for U.S. Appl. No. 12/790,772, mailed on May 24, 2012, Wang et al., "Associating Media With Metadata of Near-Duplicates", 12 pages.

Office action for U.S. Appl. No. 12/790,772, mailed on Dec. 8, 2016, Wang et al., "Associating Media With Metadata of Near-Duplicates", 21 pages.
Badi, "Recognition and Representation of User Interest", Master Thesis, Texas A&M University, Dec. 2005, 72 pgs.
Barnard, et al., "Matching Words and Pictures", retrieved on Apr. 16, 2010 at <<http://www.cs.princeton.edu/~blei/papers/Barnard-DuyguluFreitasForsythBleiJordan2003.pdf>>, JMLR.org, Journal of Machine Learning Research, vol. 3, Mar. 2003, pp. 1107-1135.
Batra, et al., "Cutout-Search: Putting a Name to the Picture", retrieved on Aug. 2, 2010 at <<http://chenlab.ece.cornell.edu/people/adarsh/publications/cvpr_iv_2009.pdf>>, IEEE Computer Society, Proceedings of Workshop on Computer Vision and Pattern Recognition (CVPR), Miami, Florida, Jun. 2009, pp. 23-30.
"Become an Online Image Detective with TinEye (groovyReview)", retrieved on Aug. 3, 2010 at <<http://www.groovypost.com/howto/groovyreview/become-online-image-detective-tineye-review/>>, groovyPost.com, Jan. 18, 2010, pp. 1-11.
bing.com, Maps, Retrieved on Dec. 28, 2009 at <<http://cn.bing.com/ditu/>>, 2 pgs.
Broder, A. et al., "A Semantic Approach to Contextual Advertising" , SIGIR, pp. 559-566, 2007.
Cai, et al., "Hierarchical Clustering of WWW Image Search Results Using Visual, Textual and Link Information", retrieved on May 26, 2010 at <<http://citeseerx.ist.psu.edu/viewdoc/download?doi=10.1.1.72.455&rep=rep1&type=pdf>>, ACM, Proceedings of International Conference on Multimedia (MM), New York, NY, Oct. 2004, pp. 952-959.
Carneiro, et al., "Supervised Learning of Semantic Classes for Image Annotation and Retrieval", retrieved on Apr. 16, 2010 at <<http://citeseerx.ist.psu.edu/viewdoc/download?doi=10.1.1.88.3490&rep=rep1&type=pdf>>, IEEE Computer Society, Transactions on Pattern Analysis and Machine Intelligence, vol. 29, No. 3, Mar. 2007, pp. 394-410.
Chang, Lin, "LIBSVM: a Library for Support Vector Machines", retrieved on Apr. 12, 2010 at <<http:// http://www.csie.ntu.edu.tw/~cjlin/papers/libsvm.pdf>>, National Taiwan University Technical Report, Computer Science and Information Engineering, 2001-2004, pp. 1-30.(software available at http://www.csie.ntu.edu.tw/~cjlin/libsvm).
Chen, et al, "Advertising Keywork Suggesiton Based on Concept Hierarchy", In Poc. of ACM WSD, 2008, 20 pages.
Chen, et al., "PVA: A Self-Adaptive Personal View Agent", Kluwer Academic Publishers, Journal of Intelligent Information Systems, Mar. 2002, pp. 173-194.
Cheng et al., "Auto-Generation of Topic Hierarchies for Web Images from Users' Perspectives", Proc 12th Intl Conf on Information and Knowledge Management, Nov. 2003, available at http://portal.acm.org/citation.cfm?id=956969, 4 pgs.
Cheng, et al., "Effective Image Annotation for Search Using Multi-level Semantics", ICADL 2003, Springer-Verlag Berlin Heidelberg, 2003, pp. 230-242.
Classification and Retrieval of Images—Published Date: Sep. 17, 2010 http://claret.wikidot.com/ 3 pages.
Crandall, et al., "Mapping the World's Photos", WWW Conference Committee, Madrid, Spain, Apr. 20-24, 2009, 10 pgs.
Deng, et al., "ImageNet: A Large-Scale Hierarchical Image Database", retrieved on Apr. 16, 2010 at <<http://wordnet.cs.princeton.edu/papers/imagenet_cvpr09.pdf>>, Proceedings of the IEEE Conference on Computer Vision and Pattern Recognition (CVPR), 2009, pp. 1-8.
Deschacht, et al., "Text Analysis for Automatic Image Annotation", retrieved on Aug. 2, 2010 at <<http://class.inrialpes.fr/pub/106-deschacht-acl07.pdf>>, Meeting of the Association for Computational Linguistics, Prague; Jun. 2007, pp. 1-8.
Evans, et al., "Adaptive Multimedia Access: From User Needs to Semantic Personalisation", retrieved on Sep. 18, 2009 at http://nets.ii.uam.es/~acemedia/publications/iscas06.pdf, IEEE International Symposium on Circuits and Systems, ISCAS 2006, Kos, Greece, May 21-24, 2006, 4 pgs.
Fellbaum (ed.), "WordNet: An Electronic Lexical Database", retrieved on Apr. 16, 2010 at <<http://www.dsoergel.com/cv/C19.pdf, MIT Press, Cambridge, MA, May 1998, pp. 1-445.

(56) References Cited

OTHER PUBLICATIONS

Fergus et al.. "A Visual Category Filter for Google Images," Computer Vision—\ ECCV, 2004, Lecture Notes in Computer Science, 2004, vol. 3021/2004, 14 pages.
Flickr. http://www.flickr.com/.
Foo, et al., "Detection of Near-duplicate Images for Web Search", retrieved on Apr. 16, 2010 at <<http://www.cs.rmit.edu.au/~jufoo/pdfs/CIVR07_Foo.pdf, ACM, Proceedings of the 6th International Conference on Image and Video Retrieval (CIVR), Amsterdam, The Netherlands, Feb. 2007, pp. 557-564.
Gelasca, et al., "CORTINA: Searching a 10 Million + Images Database", retrieved on Apr. 16, 2010 at <<http://vision.ece.ucsb.edu/publications/elisa_VLDB_2007.pdf>>, VLDB Endowment, Proceedings of Conference on Very Large Data Bases (VLDB), Vienna, Austria, vol. 7, Sep. 2007, pp. 2-5.
"Google Sets", retrieved on Dec. 15, 2008 at <<http://labs.google.com/sets>>, Google, 1 page.
www.google.com.
Grcar, et al., "User Profiling for Interest-Focused Browsing History", Oct 2005, retrieved on Sep. 18, 2009 at http://eprints.pascal-network.org/archive/00001202/01/GrcarBrowsingHistorySiKDD2005.pdf, 4 pgs.
Griffin, et al., "Caltech-256 Object Category Dataset", retrieved on Apr. 16, 2010 at <<http://authors.library.caltech.edu/7694/1/CNS-TR-2007-001.pdf>>, Caltech Technical Report 7694, 2007, pp. 1-20.
Gunduz, et al., "A User Interest Model for Web Page Navigation", In Proceedings of International Workshop on Data Mining for Actionable Knowledge (DMAK), Seoul, Korea, Apr. 2003, pp. 46-57.
Hays, et al., "Scene Completion Using Millions of Photographs", retrieved on Apr. 16, 2010 at <<http://delivery.acm.org/10.1145/1280000/1276382/a4-hays.pdf?key1=1276382&key2=4013141721&coll=GUIDE&dl=GUIDE&CFID=84511483&CFTOKEN=74352152, ACM, Transactions on Graphics, vol. 26, No. 3, Article 4, Jul. 2007, pp. 1-8.
Hua, et al. "Internet Multimedia Search and Mining"—Published date: Jan. 27, 2010.
Hua, et al. "When Multimedia Advertising Meets the New Internet Era", Int'l Workshop on Multimedia Signal Processing, pp. 1-5, 2008.
Huang, et al.. "Image Indexing Using Color Correlograms", Proc 1997 Conf on Computer Vision and Pattern Recognition (CVPR'97), Jun. 1997, 7 pages.
Jaspers et al., "Candela—Storage, Analysis and Retrieval of Video Content in Distributed Systems", retrived at <<http://vca.ele.tue.nl/publications/data/jaspers2005a.pdf>>, on Apr. 17, 2010.
Jeon, et al., "Automatic Image Annotation and Retrieval Using Cross-Media Relevance Models", Proc 26th Annual Intl ACM SIGIR Conf on Research and Development in Information Retrieval, Jul. and Aug. 2003, available at http://ciir.cs.umass.edu/pubfiles/mm-41.pdf, 8 pgs.
Jeon, et al., "Using Maximum Entropy for Automatic Image Annotation", 3rd Intl Conf Image and Video Retrieval, CIVR Jul. 2004, Proceedings Series: Lecture Notes in Computer Science, 3115, available at http://ciir.cs.umass.edu/pubfiles/mm-355.pdf, 9 pgs.
Jing, et al., "Learning Region Weighting from Relevance Feedback in Image Retrieval" In Proc. of IEEE Int. Cong. on Acoustics Speech and Signal, 2002, 4 pages.
Jing, et al., "VisualRank: Applying PageRank to Large-Scale Image Search", retrieved on May 26, 2010 at <<http://www.cc.gatech.edu/home/yjing/pami_camera_ready.pdf>>, IEEE Computer Society, Transactions on Pattern Analysis and Machine Intelligence, vol. 30, No. 11, Nov. 2008, pp. 1-14.
Jones, "Windows Live Photo and Video Blog", retrieved on Aug. 3, 2010 at <<http://blogs.msdn.com/b/pix/archive/2008/09/17/next-version-of-windows-live.aspx>>, Sep. 17 2008, pp. 1.
Joshi, et al. "Keyword Generation for Search Engine Advertising" In Proc. of the 6th IEEE Int. Cong. on Data Mining—Workshops, Dec. 2006, 24 pages.

Ke, et al., "PCA-SIFT: A More Distinctive Representation for Local Image Descriptors", retrieved on Apr. 16, 2010 at <<http://www.cs.cmu.edu/~rahuls/pub/cvpr2004-keypoint-rahuls.pdf>>, IEEE Computer Society, Conference on Computer Vision and Pattern Recognition (CVPR), vol. 2, Jun. 2004, pp. 1-8.
Kennedy, et al., "Generating Diverse and Representative Image Search Results for Landmarks", retrieved on May 26, 2010 at <<http://www.google.co.in/url?sa=t&source=web&ct=res&cd=6&ved=0CB8QFjAF&url=http%3A%2F%2Fciteseerx.ist.psu.edu%2Fviewdoc%2Fdownload%3Fdoi%3D10.1.1.119.1522%26rep%3Drep1%26type%3Dpdf&rct=j&q=generating+web+image+cluster&ei=A0irS6LUMtO6jAeJofjWDw&usg=AFQjCNEFwCBRBWDdZlkpXuFUclS1-n601g>>. ACM, Proceedings of the 17th Int'l Conf. on World Wide Web (2008).
Keyword Tool, retrieved on Sep. 18, 2009 at https://adwords.google.com/select/KeywordToolExternal, 1 pg.
Kim, H.R. et al.. "Learning Implicit User Interest Hierarchy for Context in Personalization.", In Proc. of International on Intellegent User Interface, 2003, 8 pages.
Lacera A. et al., "Learning to Advertise", SIGIR, pp. 549-556, 2006.
Letizia, L.H. "An Agent that Assists Web Browsing." In Proc. of the International Joint Conference on Aritficial Intellegence, Montreal, CA, 1995, 6 pages.
Li, J., "Automatic Linguistic Indexing of Pictures by a Statistical Modeling Approach" IEEE Transactions on Pattern Analysis and Machine Intelligence, 25(9):1075-1088, 2003.
Li, et al., "Delivering Online Adversitisements Inside Images," in Proc. of ACM Multimedia, Cancouver, Canada, Oct. 2008. 10 pages.
Li, et al., "Image Annotation by Large-Scale Content-based Image Retrieval", retrieved on Apr. 16, 2010 at <<http://doi.acm.org/10.1145/1180639.1180764>>, ACM, Proceedings of the 14th Annual International Conference on Multimedia, Santa Barbara, CA, Oct. 2006, pp. 607-610.
Li, et al., "Searching One Billion Web Images by Content: Challenges and Opportunities", retrieved on Apr. 16, 2010 at <<http://research.microsoft.com/en-us/um/people/leizhang/paper/mcam07-li.pdf>>, Springer-Verlag Berlin, Proceedings of International Workshop on Multimedia Content Analysis and Mining (MCAM), Weihai, China, Jul. 2007, pp. 33-36.
Li, et al. "Tag-Based Social Interest Discovery." WWW, pp. 675-684. 2008. 10 pages.
Liao et al, "Livelmage: Organizing Web Images by Relevent Concept", Proceedings of the Workshop on the Science of the Artificial, Hualien, Taiwan, Dec. 2005. pp. 210-220.
Lieberman, et al., "Aria: An Agent for Annotating and Retrieving Images", retrieved on Sep. 21, 2009 at <<http://www.bubblemountain.com/images/Arai-IEEE.pdf>>, IEEE, 2001, pp. 1-6.
Lin et al., "Video Collaborative Annotation Forum: Establishing Ground-Truth Labels on Large Multimedia Datasets", IBM T.J. Watson research Center, 2003, pp. 1-pp. 19.
Liu, et al., "Robust Photo Retrieval Using World Semantics", retrieved on Sep. 21, 2009 at <<http://web.media.mit.edu/~lieber/Publications/LREC.pdf>>, 2002, 6 pages.
Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.
Lu, et al., "A Unified Framework for Semantics and Feature Based Relevance Feedback in Image Retrieval Systems", ACM Multimedia 2000, ACM, 2000, pp. 31-37.
Ma, et al., "Interest-Based Personalized Search", ACM Trans. on Information Systems, vol. 25(1), 2007, 38 pages.
Mei, et al., "Contextual In-Image Advertising", retrieved on Oct. 27, 2009 at <<http://www.cs.clemson.edu/~jzwang/0901863/mm2008/p439-mei.pdf>>, MM 2008, ACM, Oct 2008, pp. 439-448.
Middleton, et al., "Capturing Knowledge of User Preferences: Ontologies in Recommender Systems." In Proc. of the 1st International Congerence on Knowledge Capture (K-Cap2001), Victoria, BC, Canada, 2001, 8 pages.

(56) References Cited

OTHER PUBLICATIONS

Miller, "Wordnet: an on-line lexical database" International Journal of Lexicography, pp. 39-41, 1990.
Monaghan, et al., "Automating Photo Annotation using Services and Ontologies", retrieved on Aug. 2, 2010 at <<http://ieeexplore.ieee.org/stamp/stamp.jsp?arnumber=01630615>>, IEEE Computer Society, Proceedings of International Conference on Mobile Data Management (MDM), 2006, pp. 1-4.
Monga, et al., "Clustering Algorithms for Perceptual Image Hashing", 2004 IEEE 11th Digital Signal Processing Workshop and IEEE Signal Processing Education Workshop, IEEE, 2004, pp. 283-287.
Moxley, et al., "Automatic Video Annotation through Search and Mining", retrieved on Apr. 16, 2010 at <<http://ieeexplore.ieee.org/stamp/stamp.jsp?tp=&arnumber=4607527>>, IEEE Conference on Multimedia and Expo (ICME), Hannover, Germany, Jun. 2008, pp. 685-688.
Murdock, et al., "A Noisy-Channel Approach to Contextual Advertising." ADKDD, pp. 21-28, 2007.
http://needleseek.msra.cn.
Noah, et al. "Binding Semantic to a Sketch Based Query Specification Tool"—Published Date: Apr. 2009 http://www.ccis2k.org/iajit/PDF/vol.6,no.2/2BSSBQST116.pdf, 8 pages.
Nowak, et al., "Sampling strategies for bag-of-features image classification," (c) Springer-Verlag Berlin Heidelberg 2006, ECCV 2006, retrieved at <<http://lear.inrialpes.fr/people/nowak/dwl/eccv06.pdf>>, 14 pages.
"Odp—The Open Directory Project", retrieved on Apr. 16, 2010 at <<http://dmoz.org/>>, 2010, pp. 1.
Ono, et al., "A Flexible Content-Based Image Retrieval System with Combined Scene Description Keyword", IEEE Proceedings of Multimedia 1996, IEEE, 1996, pp. 201-208.
Osman, et al., "Semantic Annotation and Retrieval of Image Collections", retrieved on Aug. 2, 2010 at <<http://www.scs-europe.net/conf/ecms2007/ecms2007-cd/ecms2007/ecms2007%20pdf/vv_0167.pdf>>, Proceedings European Conference on on Modelling and Simulation (ECMS), 2007, pp. 1-6.
Pan, et al., "Automatic Image Captioning" , IEEE Intl Conf on Multimedia and Expo, Jun. 2004, available at http://www.informedia.cs.cmu.edu.documents/ICME04AutoICap.pdf, 4 pgs.
Picasa 3, retrived at http://picasa.google.com/ on Aug. 4, 2009, 1 pg.
Plangprasopchok, et al. "Constructing Folksonomies from User-Specified Relations on Flickr." WWW, 2009, 10 pages.
Qiu, et al., "Compressing histogram representations for automatic colour photo categorization", The Journal of the Pattern Recognition Society, Elsevier, vol. 37, Issue 11, 2004, pp. 2177-2193.
Ribeiro-Neto, et al., "Impedance Coupling in Con-tent-targeted Advertising." SIGIR, pp. 496-503, 2005, 8 pages.
Russian Office Action mailed Mar. 25, 2011 for Russian Patent Application No. 2008145584, a counterpart foreign application of U.S. Appl. No. 11/419,368.
Satoh, et al., "Name-It: Naming and Detecting Faces in News Videos", retrieved on Aug. 2, 2010 at http://www.informedia.cs.cmu.edu/documents/nameit_IEEE-MM99.pdf>>, IEEE Computer Society, Multimedia, vol. 6, No. 1, 1999, pp. 22-35.
Strong, et al., "Organizing and Browsing Image Search Results based on Conceptual and Visual Similarities" Retrieved Date: Jan. 5, 2011 http://www.cs.mun.ca/~hoeber/download/2010_isvc_vibe_concept.pdf, 10 pages.
Torralba, et al., "80 million tiny images: a large dataset for non-parametric object and scene recognition", retrieved on Apr. 16, 2010 at <<http://people.csail.mit.edu/torralba/publications/80millionImages.pdf>>, IEEE Computer Society, Transactions on on Pattern Analysis and Machine Intelligence, vol. 30, No. 11, Nov. 2008, pp. 1958-1970.
Trajkova, et al., "Improving Ontology-Based User Profiles." In Proc. of RIAO, pp. 380-389, 2004.
Tseng et al., "Video Summarization and Personalization for Pervasive Mobile Devices", IBM T.J. Watson Research 2002, pp. 1-pp. 12.
VTT,"MobiCon—Integrated Capture, Annotation and Sharing of Video Clips with Mobile Phones", retrvied at <<http://www.vtt.fi/files/services/ipr/mobicon_integrated_capture.pdf>> on Apr. 17, 2010.
Wang, et al., "Advertising Based on Users' Photos", retrieved on Apr. 16, 2010 at <<http://ieeexplore.ieee.org/stamp/stamp.jsp?tp=&arnumber=5202834>>, IEEE International Conference on Multimedia and Expo (ICME), New York, NY, 2009, pp. 1640-1643.
Wang, et al., "AnnoSearch: Image Auto-Annotation by Search", Proc 2006 IEEE Computer Society Conf on Computer Vision and Pattern Recognition, Mar. 2006, 8 pgs.
Wang, et al., "AnnoSearch: Image Auto-Annotation by Search", retrieved on Apr. 16, 2010 at http://research.microsoft.com/en-us/um/people/leizhang/paper/cvpr06_annosearch.pdf>> IEEE Computer Society, Proceedings of Conference on Computer Vision and Pattern Recognition (CVPR), vol. 2, 2006, pp. 1483-1490.
Wang, et al. "Annotating Images by Mining Image Search Results", I-PAMI, vol. 30(11), pp. 1919-1932, 2008.
Wang, et al., "Argo: Intelligent Advertising by Mining a User's Interest from His Photo Collections", retrieved on Oct. 27, 2009 at <<http://research.microsoft.com/en-us/people/xjwang/argo_wangyuzhang_.pdf>>, ADKDD 2009, ACM, Jun. 2009, 9 pages.
Wang, et al., "Arista—Image Search to Annotation on Billions of Web Photos", retrieved on Aug. 2, 2010 at <<http://research.microsoft.com/en-us/people/xjwang/cvpr10_paper301_arista_final.pdf>>, IEEE Computer Society, Proceedings of Conference on Computer Vision and Pattern Recognition (CVPR), San Francisco, California, Jun. 2010, pp. 1-8.
Wang, et al., "Content-Based Image Annotation Refinement", retrieved on Apr. 16, 2010 at <<http://research.microsoft.com/en-us/um/people/leizhang/paper/cvpr07-changhu.pdf>>, IEEE Conference on Computer Vision and Pattern Recognition (CVPR), Jun. 2007, pp. 1-8.
Wang, et al., "Image Annotation Using Search and Mining Technologies", Proc 15th Intl Conf on World Wide Web, May 2006, 2 pages.
Wang, et al., "Large-Scale Duplicate Detection for Web Image Search", 2006 IEEE Intl Conf on Multimedia and Expo, Jul. 2006, 4 pages.
Wang, et al., "Large-Scale Duplicate Detection for Web Image Search", retrieved on Apr. 16, 2010 at http://www.cecs.uci.edu/~papers/icme06/pdfs/0000353.pdf>>, IEEE Conference on Multimedia and Expo (ICME), Toronto, Canada, Jul. 2006, pp. 353-356.
"Web Search & Mining Group" retrieved Feb. 27, 2006 at http://www.research.microsoft.com/wsm, 5 pgs.
Wenyin, et al., "Semi-Automatic Image Annotation", Proc of Interact 2001, 8th IFIP TC.13 Conf on Human Computer Interaction, Jul. 2001, 8 pgs.
Wnuk, et al. "Filtering Internet Image Search Results Towards Keyword Based Category Recognition" Retrieved Date: Jan. 5, 2011 http://vision.ucla.edu/papers/wnukS08.pdf, 8 pages.
Wordtracker, http://www.wordtracker.com, Feb. 22, 2010.
Yamamoto et al., "iVAS: Web-based Video Annotation System and its Applications", retrived at <<http://iswc2004.semanticweb.org/demos/29/paper.pdf>> on Apr. 17, 2010, pp. 1-pp. 4.
Yang, et al., "A Comparative Study on Feature Selection in Text Categorization", Proceedings of the Fourteenth International Conference on Machine Learning, 1997, pp. 412-420 (9 pgs.).
Yeh, et al., "Searching the Web with Mobile Images for Location Recognition", retrieved on Apr. 16, 2010 at <<http://groups.csail.mit.edu/vision/vip/papers/yeh_cvpr04.pdf>>, IEEE Computer Society, Conference on Computer Vision and Pattern Recognition (CVPR), vol. 2, Jul. 2004, pp. 1-6.
Zeng, et al., "Learning to Cluster Web Search Results", retrieved on Apr. 16, 2010 at <<http://net.pku.edu.cn/~wbia/2004/public_html/papers/learning-to-cluster-web.pdf>>, ACM, Proceedings of the 27th International Sigir Conference on Research and Development in Information Retrieval, 2004, Sheffield, UK, Jul. 2004, pp. 210-217.
Zhang, et al., "EnjoyPhoto—A Vertical Image Search Engine for Enjoying High-Quality Photos", retrieved on Apr. 16, 2010 at <<http://research.microsoft.com/en-us/um/people/leizhang/paper/acmmm06-enjoyphoto.pdf>>, ACM, Proceedings of the 14th

(56) References Cited

OTHER PUBLICATIONS

Annual International Conference on Multimedia (MM), Santa Barbara, California, Oct. 2006, pp. 367-376.

Zhou, et al. "Utilizing Search Intent in Topic Ontology-based User Profile for Web Mining." In Proc. of IEEE Int. Conf. on Web Intellegence, 2006, 4 pages.

* cited by examiner

TEXT TO IMAGE TRANSLATION

BACKGROUND

A picture is worth a thousand words. Images play an important role in helping users understand the semantics or meanings of a web based textual query. This understanding enhances a user's search and web browsing experience. For example, given a textual description of a new concept or object, most people will try to imagine its appearance in their mind. Simply providing image responses to a text based query will help users understand the semantics of the query text more fully at a glance.

Commercial search engines often include images in responses to textual queries. Commonly, these responses include images that are currently most popular, part of a current trend (e.g., trending now) or associated with web based user search patterns. Unfortunately, image responses based on popularity, trends of search patterns may not best represent the actual intent of the textual query.

Other systems may leverage term categorization to find image responses associated with one or more semantic classes of a textual query. These systems often use image sets with well defined semantics identified a-priori to generate responses to textual queries. Unfortunately, these systems are limited by the pre-defined semantics, and may not provide image responses that best represent a broad array of potential textual queries.

BRIEF SUMMARY

This Summary is provided to introduce a selection of concepts involving text to image translation in a simplified form that are further described below in the Detailed Description. This Summary is not intended to identify key features or essential features of the claimed subject matter, nor is it intended to be used to limit the scope of the claimed subject matter. The term "techniques," for instance, may refer to device(s), system(s), method(s) and/or computer-readable instructions as permitted by the context above and throughout the document.

This disclosure relates to techniques for an automated text to image translation process that includes finding representative image answers for open web textual queries. In an aspect, semantic classes and analogous items (e.g., analogous terms) associated with semantic classes of the query and the query may be leveraged to obtain images representing each semantic class of a query. Textual information surrounding images, such as open domain web based images and near-duplicate images, may be leveraged to identify high-quality textual features (e.g., representative text) related to the query.

In some embodiments, one or more query-dependent classifiers may be trained online to discern between images associated with the semantic classes of the query and to remove noisy images that are not associated with the semantic classes of the query. Resultant images may be ranked using a relevance score and/or a confidence score to find images that are most representative of the query. The most representative images may be provided in a response to the query.

This disclosure also describes embodiments of text to image translation that are efficient, such that the entire text to image translation process, including the training of query-dependent classifiers, may be performed online in real time, or substantially real time, after a textual query is submitted.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Overview

As noted above, services today provide images in response to textual queries. The images provided are often manually edited, of limited semantics relative to thousands of potential semantic classes, and/or are often incorrect or include less than optimal image results in response to a broad range of user queries. In an attempt to cover a broader range of user queries, some existing services employ extensive off-line training utilizing very large training sets that do not result in image answers that are tailored for a specific query. As the number of users and services that require high quality image answers for textual queries increases, the range and scope of user supplied queries is expected to increase.

This disclosure describes techniques for providing "representative" image answers associated with a textual query, which are tailored for the specific query. For example, a user or entity may enter a textual query, and receive image answers as a response, which are specifically tailored to the textual query.

Example Environment for Text to Image Translation

Figure 1:
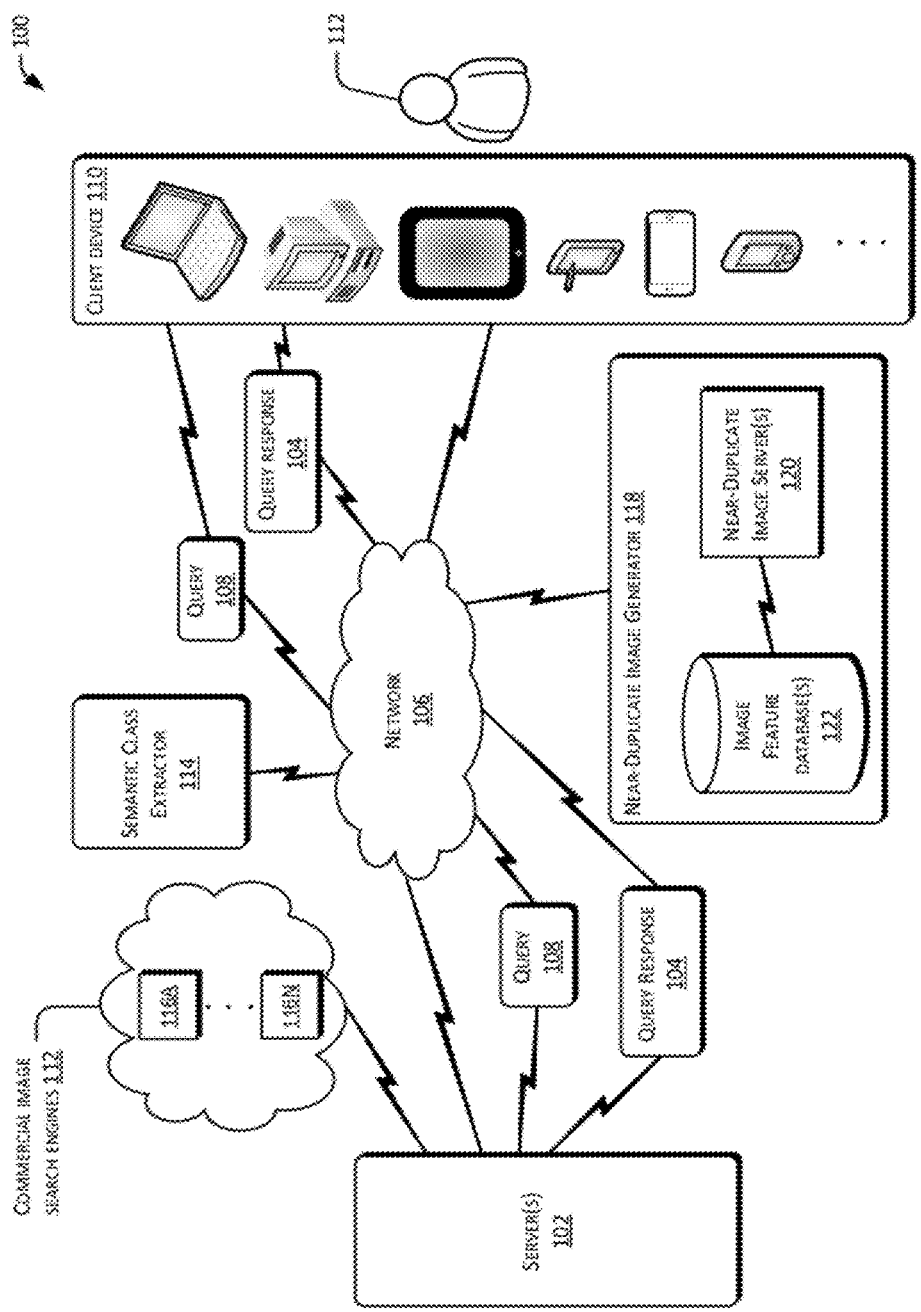
FIG. 1 is a pictorial diagram of an example environment for implementing text to image translation.

FIG. 1 illustrates an example environment 100 usable to perform text to image translation. Example environment 100 includes one or more servers 102 that provide a query response 104 over a network 106 in response to a query 108 from, for example, client device 110. Query 108 may be generated by a user, for example, user 112. Network 106 is representative of, for example, the Internet, an intranet, a wide area network, a metropolitan area network, a telephone/telecommunications network, a communications network, a local area network, combinations of the foregoing, or the like, any or all of which may be wired and/or wireless.

Client device 110 represents various types of network capable devices configured to send a query 108 and receive a query response 104 via network 106. Examples of client device 110 include a desktop computer, laptop computer, net book, personal digital assistant, smart phone, client computer, server computer, fixed or mobile computing device, wearable or implanted computing device, or the like.

Server 102 represents one or more network capable devices configured to receive a query 108 and provide a query response 104 via a network 106. Server 102 may include a single computing device, one or more computing devices located at a single location, such as a data center, and/or located at multiple disparate locations accessible via network 106 and/or other networks (not shown).

Server 102 may be configured to implement text to image translation and provide a text to image translation service. For example, as shown in FIG. 1, server 102 directly or indirectly receives a textual query 108, and in response, provides image answers to query 108 in query response 104 provided directly or indirectly to client 110.

As part of a text to image translation process, server 102 may provide all, part and/or a representation of query 108 to semantic class extractor 114. Semantic class extractor 114 may be part of server 102, collocated with server 102, or be accessible via a network, such as network 106, or other network or connection (not shown). In response to receiving information associated with query 108, semantic class extractor 114 determines one or more semantic classes and analogous terms relating to each semantic class associated with query 108. For example, semantic class extractor 114 provides a semantic class descriptor and associated analogous item descriptors to server 102 for each of the determined semantic classes of query 108.

Table 1 shows examples of semantic class descriptors (also referred to herein as "semantic classes") and associated analogous item descriptors (also referred to herein as "analogous items" or "analogous terms") that may be returned by semantic class extractor 114 in response to receiving a query, query term, query representation, or the like. Note that the analogous terms may be broadly related to both their associated semantic class as well as their associated query. For example, the analogous terms "jaguar, cougar, panther, leopard, tiger, etc." in Table 1 are broadly related to the semantic class "Animal" and also broadly related to the query "puma." Thus, the analogous terms may provide for increased diversity of the associated semantic class in view of the associated query.

TABLE 1

| Query | Semantic Class | Analogous Items |
| --- | --- | --- |
| puma | Animal | jaguar, cougar, panther, leopard, tiger, etc. |
|  | Brand | adidas, nike, gucci, prada, LV, calvin klein, etc. |
| java | Language | perl, php, python, c#, javascript, etc. |
|  | Country | China, India, France, Germany, Poland, etc. |
| TLC | Artist | Usher, Madonna, Avril, Vitas, Ludacris, etc. |
|  | Channel | bbc, fox, cnn, cbs, espn, etc. |

Semantic class extractor 114 may be configured to automatically extract and aggregate semantic knowledge from data stores, such as tera-scale open-domain data sources, and provide semantic search results based on the aggregated knowledge. One example of such a tera-scale open-domain data source is NeedleSeek, provided by Microsoft Research Asia of Microsoft Corporation, Redmond Wash., U.S.A., however other data stores may also be used. The semantic knowledge of semantic class extractor 114 may be obtained by natural language processing of web pages. For example, if there are a sufficient number of web pages which contain "apple is a kind of fruit," then "fruit" is assumed to be a semantic class of "apple." Moreover, if a certain number of web pages contain "pear is a kind of fruit," then "pear" is assumed to share the semantic set "fruit" with "apple." Semantic class extractor 114 contains the semantic knowledge to provide term disambiguation for a query as it may support open-domain queries, provide nearly complete knowledge of semantic classes associated with a query, and provide analogous items/terms associated with each of the semantic classes.

Server 102 may rank the analogous terms in order of their importance relative to their associated semantic class and/or query 108. Server 102 may formulate various combinations of all or part of the semantic class descriptors, the ranked analogous terms and/or query 108 into individual requests that relate to each of the one or more semantic classes associated with query 108. This results in a greatly diversified set of requests associated with each semantic class of query 108.

Server 102 may then use these requests to obtain web based images representative of each of the one or more semantic classes of query 108 from, for example, one or more commercial image search engines 116, or the like. Server 102 may also use all, part and/or a representation of query 108 directly to obtain additional web based images.

Server 102 may rank, based on a determined relevance, web based images received for each request, and identify only selected ones of the top ranked subset of web based images and associated surrounding text of each corresponding web based image. Server 102 may request and/or obtain near-duplicate images associated with each of the selected web based images from, for example, near-duplicate image generator 118.

Near-duplicate image generator 118 may be configured to provide a web based near-duplication image service. In one aspect, near-duplicate image generator 118 may provide near-duplicate images to server 102 via a network, such as network 106, or other network or connection (not shown). In another aspect, all or part of near-duplicate image generator 118 may be collocated or integrated with server 102. Near-duplicate image generator 118 may be configured to rapidly provide near-duplicate images in support of an online text to image translation process or service (e.g., 100 near-duplicate images, selected from 1.6 billion sample images, provided in tens of milliseconds).

For example, near-duplicate image generator 118 may be configured to process a request or command that includes an image, image portions, raw image data, image features, hash code of an image, visual code words associated with an image, metadata, and/or surrounding text of an image, or the like. In response to the request or command, near-duplicate image generator 118 provides near-duplicate images and/or their appropriate visual representations and associated surrounding text to a requestor (e.g., server 102).

Near-duplicate image generator 118 may contain one or more near-duplicate image server(s) 120 and one or more image/feature database(s) 122. Near-duplicate image servers 120 may be collocated, such as in a data center, or distributed in local and/or disparate locations, or combinations thereof, connected via a network, such as network 106, or other networks (not shown). One or more near-duplicate image servers 120 may be collocated or integrated with server 102.

Image/feature database(s) 122 may contain a large collection of web based images and/or representations of web based images, as well as surrounding text associated with the images. In an aspect, the number of images represented in image/feature database(s) 122 may be large, potentially exceeding 1.5 billion. However, smaller data sets may also be used. One rationale for having a large collection of images is that as this image dataset grows, the probability of finding visually similar images increases sharply. When the probability of visual similarity exceeds a certain threshold, the probability of the corresponding images belonging to the same visual class grows rapidly, which means that visual similarity approaches semantic similarity. Therefore, a large collection of images and associated surrounding text facilitates text to image translation of virtually any user supplied query.

Image/feature database(s) 122 may be collocated, such as in a datacenter, or distributed in local and/or disparate locations connected via a network, such as network 106, or other networks (not shown). One or more image/feature database(s) 122 may be physically or logically connected to one or more near-duplicate image servers 120. One or more image/feature databases 122 may be collocated with server 102.

Upon receipt of images from near-duplicate image generator 118, server 102 stores, analyzes and processes the near-duplicate images and their associated surrounding text that are representative of each corresponding near-duplicate image. For example, server 102 may use the surrounding text of associated near-duplicate images to determine high-quality textual features (i.e., representative text) associated with each semantic class of query 108. Server 102 may rank the representative text associated with each semantic class based on current relevance to an associated semantic class and/or query, a frequency of occurrence of terms within surrounding text, td-idf (term frequency-inverse document frequency), a chi-squared scheme and/or other relevance ranking techniques.

Server 102 may train online in real time, after receipt of query 108, one or more local classifiers specifically tailored to query 108. Server 102 may train the local classifier(s) using the highest ranked high-quality representative textual features. Server 102 may use the trained local classifier(s) to further separate images into their appropriate semantic class, and/or to "denoise" (e.g., remove noisy) images that do not specifically belong to one of the identified semantic classes of query 108. Server 102 may use the local query-dependent classifier(s) to facilitate creation of a denoised image set for each semantic class associated with query 108.

Server 102 may rank images in each denoised image set, and provide the top ranked images for each semantic class as an image answer in response to query 108 in query response 104.

Example System

Figure 2:
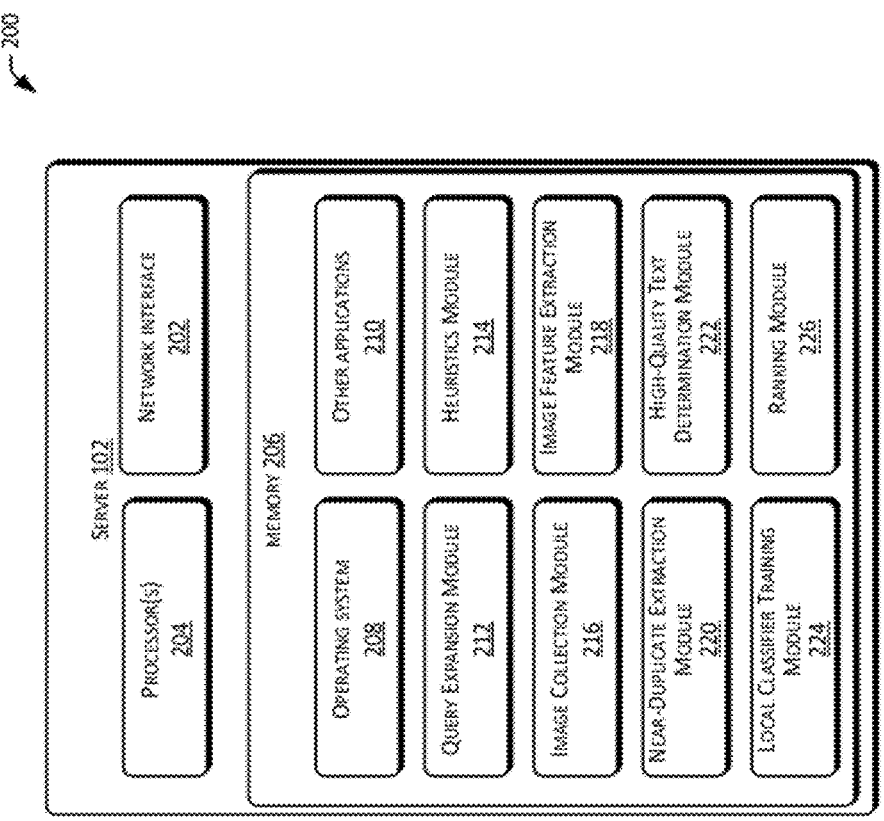
FIG. 2 is a block diagram that illustrates components of an example computing device for implementing text to image translation.

FIG. 2 is a block diagram that illustrates various example components of an example computing device in system 200, such as server 102, for performing text to image translation.

Example server 102 includes one or more network interfaces 202, one or more processors 204, and memory 206. Network interface 202 enables server 102 to communicate with other devices over a network, such as network 106. Network interface 202 also facilitates reception of queries, for example, query 108, and transmission of query responses, such as query response 104.

Operating system 208, and one or more other applications 210 are stored in memory 206 as computer-readable instructions, and are executed, at least in part, on processor(s) 204. Operating system 208 facilitates execution of, and Input/Output (I/O) for, applications, software modules, software objects, applets, components and the like, as is common in the art.

Example server 102 also includes query expansion module 212, heuristics module 214, image collection module 216, image feature extraction module 218, near-duplicate extraction module 220, high-quality text determination module 222, local classifier training module 224 and ranking module 226.

Query expansion module 212 may be configured to facilitate query term disambiguation by obtaining semantic classes and associated analogous items (e.g., analogous terms) for a given query. Table 1, as shown above, provides an example of queries, semantic classes and associated analogous items. All or part of a semantic class name may be incorporated as one or more of the associated analogous items.

In an aspect, query expansion module 212 may provide all, part and/or a representation of a given query to semantic class extractor 114 to obtain the semantic class(es) and analogous items for the given query. Query expansion module 212 may also be configured to determine if a query is a single or a multi-class query by evaluating a number of obtained semantic classes.

In one aspect, the analogous terms may be representative of their associated semantic class, such that not every analogous item may be specifically analogous to the query. In another aspect, some or all of the analogous terms may be representative of both their associated semantic class and associated query. For example, given the query "puma," Table 1 shows that the exemplary analogous items associated with the semantic class "animal" are "jaguar, cougar, leopard, tiger, etc." Although the illustrative analogous terms "jaguar, leopard and tiger" are directly associated with the semantic class "animal," they are not directly analogous to the query "puma." Nevertheless, the analogous terms associated with the semantic class "animal" are associated with the query term "puma" at least because they are all members of the cat family. Therefore, the analogous items greatly increase the semantic diversity of the associated semantic class in light of the corresponding query.

The number of analogous items for an associated semantic class of a query may be quite large (e.g., >100). For example, query expansion module 212 uses analogous items to expand the dimensionality and/or diversity of the query to more broadly represent a semantic class, as will be discussed more fully below.

In an aspect, query expansion module 212 may rank the analogous terms based on their relevance to their associated semantic class and/or associated query, and/or based on other ranking criteria. Once ranked, query expansion module 212 may select the top ranked subset of the analogous items for each associated semantic class. In another aspect, one or more other modules may perform the ranking and selecting of the top ranked analogous items using similar or other ranking techniques.

For example, query expansion module 212 may formulate semantic class names, top ranked analogous items and/or other associated text into individual requests that relate to each of the semantic classes associated with query 108. In one aspect, for each semantic class of query 108, query expansion module 212 may formulate requests that each include various combinations of all, part or parts of the associated semantic class name and/or all, part or parts of one or more of the top ranked analogous items. In another aspect, for each semantic class of query 108, query expansion module 212 may formulate requests that are associated with one or more of the top ranked analogous items. In another aspect, for each semantic class, query expansion module 212 may formulate requests where each request is associated with a unique one of all or a subset of the top ranked analogous items. In these example aspects, a diverse set of requests may be formulated that are associated with query 108.

Heuristic module 214 may be configured to reduce or minimize a semantic gap between, for example, terms in the requests represented in the text domain relative to terms used in the image domain. In an aspect, heuristic module 214 may replace, modify and/or remove all, a part or parts of each of the formulated requests generated by query expansion module 212 to reduce or minimize the semantic gap.

For example, the query expansion module 212 may indicate that "Volkswagen" belongs to the semantic classes of "manufacturer" and "brand." However, in submitting a query of "Volkswagen manufacturer" or "Volkswagen brand," the search results may be populated with noisy and low-quality images because of the semantic gap between these textual queries and the images provided in response to the textual queries. This is because current commercial image search engines are text-based, while in the image domain, Volkswagen car images seldom have "manufacturer" or "brand" in their surrounding text. For example, showing a Volkswagen© logo instead of a car photo as the image answer to the query "Volkswagen" may be preferable, because the Volkswagen logo may be more representative of the query intent. Also, there are too many types of Volkswagen cars to determine which one is more representative of the query intent. Therefore, heuristic module 214 may be configured to replace all or part(s) of terms in formulated requests that include the terms "manufacturer" and/or "brand" with the term "logo" to reduce the semantic gap between the text domain and the image domain. Heuristic module 214 may also be configured to incorporate human prior knowledge to minimize the semantic gap by replacing, modifying and/or removing terms.

Once the formulated requests are determined (e.g., by query expansion module 212 and heuristic module 214), image collection module 216 may use the formulated requests to request and collect associated image answers for the requests. In one aspect, image collection module 216 may collect image answers as responses to the formulated requests from, for example, one or more of commercial image search engines 116. The image answers collected may include web based images and associated surrounding text of the web based images.

Image collection module 216 may formulate the images into an initial candidate image set for each of the semantic classes of a given query. Stated another way, image collection module 216 creates an initial candidate image set for each semantic class of a given query by assigning collected images and associated surrounding text to a corresponding one of the initial candidate image sets.

Image collection module 216 may be configured to maintain an index that relates collected images to their associated semantic class, their associated formulated request, and/or their associated analogous item(s). Image collection module 216 may rank collected images for each request according to their relevance to their associated semantic class, their relevance to their associated formulated request, their relevance to the query, visual aspects related to a semantic class, term frequencies or commonalities of surrounding text of collected images, number of available near-duplicate images associated with each collected image, or based on other ranking criteria. In one aspect, image collection module 216 may select a number of the top ranked collected images associated with each corresponding formulated request. In another aspect, one or more other modules may be used to perform the ranking and selecting of the collected images. Image collection module 216 may organize selected top ranked images and their surrounding text for each request to create a ranked candidate image set for each of the semantic classes of a given query. In another aspect, one or more other modules may be used to create the ranked candidate image set for each of the semantic classes of a given query.

Image feature extraction module 218 may be configured to extract image features from images, such as images in each of the ranked candidate image sets. The image features may include one or more visual features of an image, a mapped hashcode representation of an image, visual codeword(s) determined from an image, raw image data from an image, image data of a different format, a compressed version of an image, a processed version of an image, an original image, an image unaltered, image metadata, or the like.

Near-duplicate extraction module 220 facilitates extraction of near-duplicate images for selected images, such as, images in the ranked candidate image sets. In one aspect, near-duplicate extraction module 220 may be configured to provide one or more image features generated by image feature extraction module 218 for a selected image to near-duplicate image generator 118. In response, near-duplicate image generator 118 determines and returns near-duplicate images and corresponding text (e.g., surrounding text, representative text) associated with each of the near-duplicate images.

In another aspect, near-duplicate image generator 118 may expose image representations for images stored, for example, in image/feature database 122, to near-duplicate extraction module 220. In this aspect, near-duplicate extraction module 220 determines which near-duplicate images and corresponding surrounding text will be provided by near-duplicate image generator 118 for each selected image.

Near-duplicate extraction module 220 may be configured to determine a number of near-duplicate images that are available for a selected image. For example, for a selected image, near-duplicate extraction module 220 may determine or obtain a number of near-duplicate images that are available from near-duplicate image generator 118.

To reduce noise, near-duplicate extraction module 220 may be configured to remove images that have less than a predetermined number (e.g., 3) of near-duplicate images from a corresponding image set.

In one aspect, near-duplicate extraction module 220 expands each of the ranked candidate image sets to include their associated near-duplicate images and corresponding surrounding text to create expanded candidate image sets. In this aspect, each expanded candidate image set may include a subset of its initial and/or ranked images and a subset of associated near-duplicate images and corresponding surrounding text.

In another aspect, near-duplicate extraction module 220 expands each of the ranked candidate image sets to include only their appropriate near-duplicate images and corresponding surrounding text to create the expanded candidate image sets. In this aspect, each expanded candidate image set may contain only its associated near-duplicate images and may not contain its associated ranked images. Each expanded candidate image set may be associated with a specific semantic class of the given query.

High-quality text determination module 222 may be configured to process one or more terms of the query and/or the surrounding text of each image in each expanded candidate image set to determine high quality text (i.e., representative text) that best represent corresponding images in view of the query and each associated semantic class of the query. High-quality text determination module 222 may be configured to represent an image by one or more of the high-quality text.

In one aspect, high-quality text determination module 222 may group the surrounding text of the images in each of the expanded candidate image sets into an associated training document and weight a feature vector of the training document based in part on characteristics of the surrounding text, such as term frequencies, known terms, or the like. High-quality text determination module 222 may then use feature vector weights to determine high-quality text for each associated semantic class of the given query.

In another aspect, high-quality text determination module 222 may group the surrounding text of the images in each of the expanded candidate image sets into an associated training document (e.g., semantic group) and tokenize the surrounding text of each training document into n-grams (e.g., n≤3). Stopwords may be determined and removed from each of the n-grams and/or surrounding text. Stopwords may be determined by analysis of surrounding text in one or more groups and/or determined a-priori by an online or offline technique. Additionally, a generated vocabulary of web stopwords for images may be used to identify stopwords for removal. Terms and/or n-grams whose document frequency (DF), across all of the groups, is less than a threshold (e.g., DF≤$3^2$), may also be removed from an associated training document. For example, weights may be assigned to each of the remaining terms or n-grams in each of the training documents based on relevance to their associated semantic group, relevance to the given query, the term frequency of terms or n-grams in each of the groups and/or the term frequency of terms or n-grams across the groups, or the like.

For example, high-quality text determination module 222 may use a TF-CHI (i.e., tf*$\chi^2$) scheme to assign weights to each of the remaining terms and/or n-grams in a training document corresponding to their chi-square value. The top weighted terms and/or n-grams may then be selected as the high quality text to represent an associated semantic class. Table 2 is an example of the top 5 terms or phrases in the order of their chi-square value associated with each semantic class of the example queries "Lincoln," "fox," "mouse," "java" and "lotus."

TABLE 2

| Query | Semantic Class | Top 5 terms or phrases in the order of chi-square value |
|---|---|---|
| Lincoln | president | president, United States, politics, American, history |
| | manufacturer | price, product, buy, manufacturer, brand |
| | county | county, map, county map, location, area |
| fox | animal | animal, wildlife, pet, species, wild |
| | studio | studio, screenshot, game, play station, x-box |
| | channel | channel, logo, cable, network, media |
| | celebrity | celebrity, actress, Hollywood, gossip, sexy |
| mouse | animal | animal, pet, wildlife, funny, wild |
| | device | device, mobile, gadget, phone, electron |
| java | language | language, text, book, software, product |
| | country | map, country, travel, country map, geographic |
| lotus | flower | flower, rose, garden, florist, gift |
| | car | car, auto, motor, vehicle, wallpaper |

High-quality text determination module 222 may represent images in each of the expanded candidate image sets by an associated part or parts of the high-quality text that are determined. In one aspect, high-quality text determination module 222 may replace, modify and/or remove surrounding text of associated images in each of the expanded candidate image sets with a part or parts of the high-quality text. In another aspect, high-quality text determination module 222 may determine images in each of the expanded candidate image sets having surrounding text associated with a part or parts of the high-quality text, and represent those determined images by an associated part or parts of the high-quality representative text.

Expanding the query using query expansion module 212 may introduce noisy images into initial, ranked and/or expanded candidate image sets. This may be due to the inherent semantic gap between the text domain and the image domain, noisy images returned by search engines, mix-ups in semantic classes, or the like. Noisy images in an initial candidate image set may also exacerbate noise in images obtained by near-duplicate image extraction.

Local classifier training module 224 may be configured to train one or more local classifiers online to "denoise" (e.g., remove noisy images from) each expanded candidate image set to create associated denoised candidate image set(s). For example, referring back to Table 1, for the given query "puma," one objective of the local classifier is to remove images that do not belong to either of the semantic classes "Animal" or "Brand." Another objective of the local classifier is to separate animal puma images from puma brand images. Therefore, in one aspect, local classifier training module 224 may train the one or more local classifiers to assign candidate images to their appropriate semantic class. Additionally, for queries that have multiple semantic classes, local classifier training module 224 may train the one or more local classifiers as multiple one-against-one classifiers.

Local classifier training module 224 may train the one or more local classifiers (i.e., query-dependent classifier(s)) based specifically on the given query. For example, if a user supplies a given query online for text to image translation, local classifier training module 224 may not train the one or more a local classifiers until after the given query is submitted by the user. As part of the online text to image translation process, the one or more local classifiers are trained online, while the user is waiting for a response to the given query. Thus, local classifiers may be custom tailored to the user supplied query (e.g., query 108) and trained online, for example, while the user is waiting for a query response (e.g., query response 104). Local classifiers may include linear support vector machines (SVM), nearest neighbor classifiers, neural networks, or the like.

Regarding techniques that do not use query-dependent classifier(s), a given open-domain query supplied by a user could pertain to one or more of thousands of possible semantic classes. One approach to classifying the query is to use a general classifier trained over numerous semantic classes. However, to learn a general classifier based on all of the possible semantic classes of queries is impractical due at least to the magnitude of such a training problem. As another approach, individual "independent" classifiers may be used. However, learning an individual "independent" classifier for each of the thousands of semantic classes is very expensive due at least to the costs associated with maintaining, training and storing thousands of such classifiers. Furthermore, these individual "independent" classifiers do not exploit specific classification dependencies that may exist between a unique set of semantic classes associated with a specific query.

Therefore, local query-dependent classifiers that are specifically trained to discern between images associated with the query and each specific semantic class of the query inherently provide greater classification performance as compared to a general classifier or independent classifiers, because query-dependent classifiers are specifically trained in view of the actual query. Thus, query-dependent classifiers trained online in real time encompassing only aspects associated with each specific semantic class identified for a given query provide better classification performance compared to classifiers trained using other common techniques. Specifically, local classifier training module 224 may train query-dependent classifiers online in real time in a fully automatic manner for identifying candidate image answers associated with a given query.

Local classifier training module 224 may also be configured to determine, select and store training data used to train a local classifier. In one aspect, local classifier training module 224 determines and selects training data for each semantic class of a query from a group that may include associated high-quality text, semantic class names, analogous items, surrounding text of images, the query text, or the like.

In another aspect, local classifier training module 224 uses the high-quality representative text provided by the high-quality text determination module 222 to train one or more local classifiers. In this aspect, the greatly reduced dimensionality inherent in the high-quality representative text, relative to all other potential training text, provides for much more rapid training of local classifiers. Thus, training classifiers using the high-quality representative text facilitates online real time training of query-dependent classifiers.

Ranking module 226 may be configured to score and rank images in each of the denoised candidate image set(s) to identify the most representative images for each semantic class of the given query. For example, ranking module 226 may determine a relevance score r and a confidence score c used in a scoring function to score images in each of the denoised candidate image set(s). In an aspect, ranking module 226 may determine the most representative (i.e., top ranked) images as those having the highest score. These top ranked images may be assumed to be the best image answers for each semantic class of the given query.

The relevance score r may measure an alignment (e.g., similarity) of an image in a denoised candidate image set with its corresponding semantic class. In one aspect, for an ambiguous query which has multiple semantic classes, ranking module 226 may merge all of the training examples of a semantic class into a single document and an associated feature vector of the training examples may be weighted using the TF-CHI (e.g., term frequency-chi-squared) weighting scheme. Terms which are most discriminative for each semantic class have high CHI-Square values. For a query with a single semantic class, ranking module 226 may use a simple term frequency (TF) weighting scheme to find terms which are most discriminative of the single semantic class. The relevance score r of an image may be defined as the cosine similarity between the terms which are most discriminative of the image and its associated semantic class.

The confidence score c of an image measures the confidence that the image belongs to a specific semantic class of a query. For example, the more K-nearest neighbors that the image has that belong to the specific semantic class, the greater the confidence may be that this image belongs to the same semantic class. The confidence score c may be defined as follows:

$$c_i = \frac{\sum_{s(i,nn_j)==1} \cos(i, nn_j) * r_{nn_j}}{\sum_{j=1}^{K} \cos(i, nn_j) * r_{nn_j}} \quad (1)$$

where $c_i$ is the confidence score of image i, $nn_j$ is the j-th nearest neighbor of image i, $\cos(i, nn_j)$ is the cosine similarity between image i and its j-th neighbor, $r_{nn_j}$ is the relevance score of $nn_j$ and $s(i, nn_j)==1$ means the two images belong to the same class, otherwise $s(i, nn_j)==-1$ For example, K may be set equal to 5.

Based on the confidence score c and the relevance score r, the ranking module 226 may score each image in each denoised candidate image set using the following equation:

$$score_i = \frac{\sum_{j=1}^{K} s(i, nn_j) * \cos(i, nn_j) * r_{nn_j} * c_{nn_j}}{K} \quad (2)$$

Regarding equation (2), an image with more nearest neighbors having a high relevance score and belonging to the same semantic class may be more representative of the image's semantic class. Contrarily, an image that has more nearest neighbors having a low relevance score or belonging to a different semantic class may be less representative of the image's semantic class.

In an aspect, ranking module 226 determines the score of images in each denoised candidate image set using, for example, equation (2), and identifies the top scored images in each denoised candidate image set as the most representative images associated with the given query. Ranking module 226 may select a subset of the most representative images for each semantic class of the query as an image answer for the query.

In another aspect, ranking module 226 ranks each image in each denoised image set based in part on a relevance score that measures an alignment (i.e., similarity) of each image with its corresponding semantic class and a confidence score proportional to a number of nearest neighbors associated with each image. Ranking module 226 may select a subset of top ranked representative images from each denoised image set as an image answer for each semantic class of the query.

In another aspect, ranking module 226 ranks each image in each denoised image set based in part on a relevance score that measures an alignment of each image with its corresponding semantic class, a confidence score based in part on a number of nearest neighbors associated with each image and a relevance score associated with each of the nearest neighbors associated with each image. Ranking module 226 selects top ranked representative images from each denoised image set as an image answer for each semantic class of the query.

Ranking module 226 may be configured to provide the image answer, for example, in query response 104.

Computer-Readable Media

The memory 206 of system 200 is an example of computer-readable media. As used herein, the term computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Figure 3:
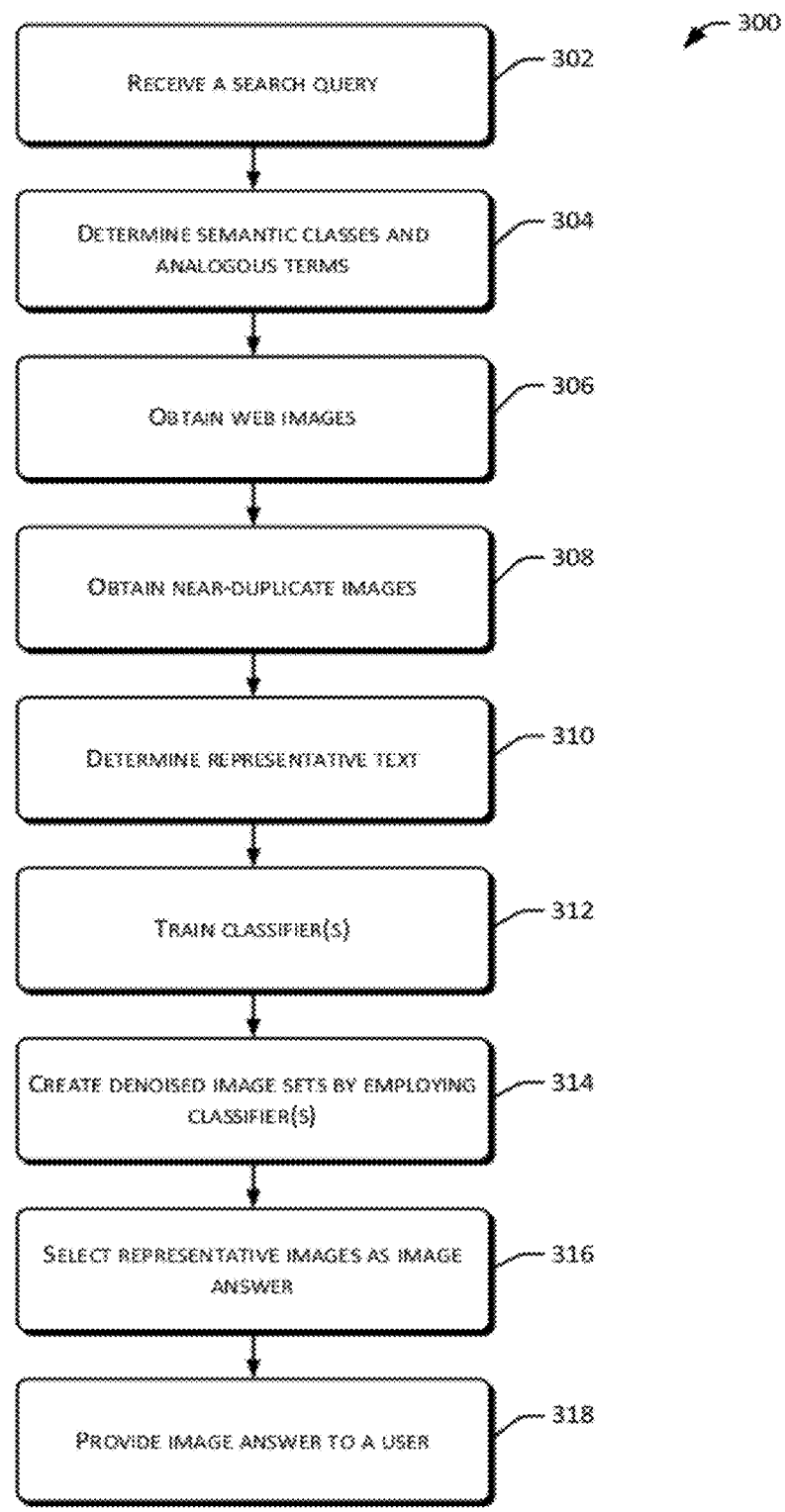
FIG. 3 is a flowchart showing an example text to image translation process.

FIG. 3 is a flowchart showing an illustrative method 300 of a text to image translation process. Method 300 is described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The method 300 may, but need not necessarily, be implemented using server 102 of FIG. 1. For convenience, the method 300 is described below in the context of server 102 and environment 100 of FIG. 1. However, the method 300 is not limited to performance in this environment.

In an illustrated implementation, method 300 begins at 302 with server 102 receiving a search query.

At 304, server 102 determines semantic classes and associated analogous terms for a search query. For example, server 102 requests semantic class information for a query from semantic class extractor 114. In response, semantic class extractor 114 returns to server 102, one or more semantic classes of the query, in addition to analogous terms associated with each of the one or more semantic classes. The analogous terms provide semantic diversity for their associated semantic class. Analogous terms may represent example terms or items of their associated semantic class. Additionally, the analogous terms may also represent items or terms related to both their semantic class and the search query.

At 306, server 102 obtains web images using analogous terms associated with each of the one or more semantic classes of the query. For example, server 102 uses analogous terms to obtain web images from commercial image search engines 116. In an aspect, server 102 may rank analogous terms and obtain web images using a top ranked and/or subset of the ranked analogous terms. In another aspect, server 102 may rank analogous terms and obtain web images for each analogous term of a subset of the top ranked analogous terms, or the like.

At 308, server 102 obtains near-duplicate images from near-duplicate image generator 118 associated with web images. Multiple near-duplicate images with associated surrounding text may be obtained for a corresponding web image. In an aspect, server 102 may rank web images and obtain near-duplicate images for each web image of a top ranked subset of the web images.

At 310, server 102 analyzes surrounding text associated with, for example, the obtained near-duplicate images, to determine high-quality representative text. Server 102 maintains an association between surrounding text, representative text, and the corresponding semantic class of the query. In an aspect, server 102 uses high-quality text determination module 222, as described above, to determine the high-quality representative text.

At 312, server 102 trains at least one query-dependent classifier using the representative text. A query-dependent classifier is trained to remove noisy images that do not belong to an associated semantic class of the query, and/or to determine an appropriate semantic class associated with an image. In an aspect, server 102 may train at least one query-dependent classifier using representative text associated with near-duplicate images.

At 314, server 102 creates a denoised image set for each of the one or more semantic classes of the search query by employing the at least one query-dependent classifier. For example, the at least one query-dependent classifier may be employed to remove noisy images and/or change image to semantic class relationships to facilitate creation of each denoised image set.

At 316, server 102 selects the most representative of one or more images from each denoised image set as an image answer for the query. In an aspect, server 102 may use a scoring function, such as equation (2) shown above, to rank images from each denoised image set and select a top ranked of the images as the most representative of images. At 318, server 102 provides a subset of the most representative of images as an image answer to a user as a response to the search query.

Figure 4:
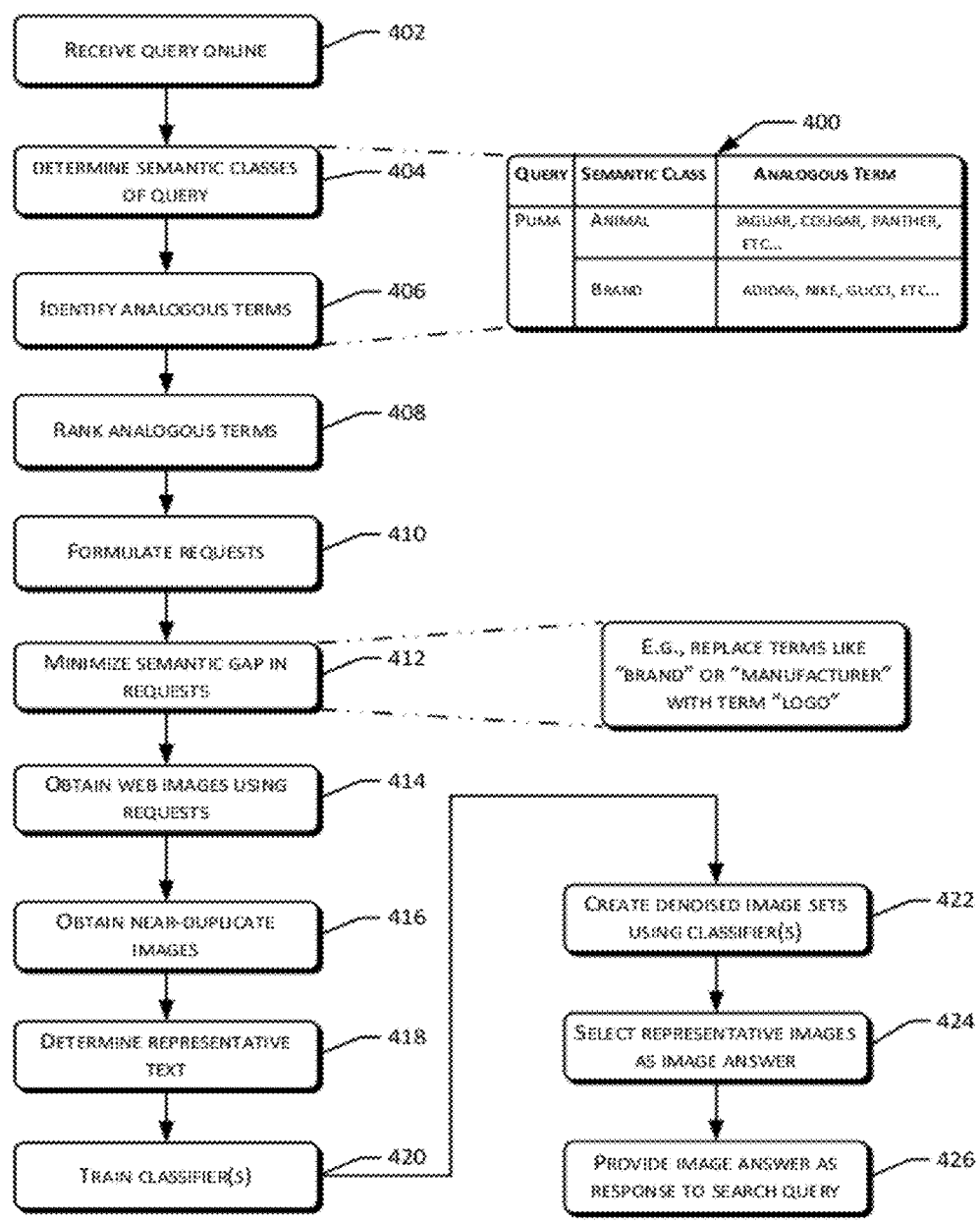
FIG. 4 is a flowchart of showing an example of online query processing using a text to image translation process.

FIG. 4 is a flowchart showing an illustrative method 400 of online query processing using a text to image translation process. The method 400 may, but need not necessarily, be implemented using server 102 of FIG. 1. For convenience, the method 400 is described below in the context of server 102 and environment 100 of FIG. 1. However, the method 400 is not limited to performance in this environment.

In an illustrated implementation, method 400 begins at 402 with server 102 receiving a query online, such as query 108 of FIG. 1.

At 404, server 102 determines semantic classes of a query. For example, server 102 requests semantic class information for query 108 from semantic class extractor 114. In response, semantic class extractor 114 returns to server 102, one or more semantic classes of the query.

At 406, server 102 identifies analogous terms associated with each of the semantic classes of the query. For example, server 102 identifies analogous terms in the semantic class information provided by semantic class extractor 114.

At 408, server 102 ranks each of the analogous terms of an associated semantic class to create ranked analogous terms. The ranking of the analogous terms may be based at least in part on semantic relevance of the analogous terms to the associated semantic class and the query. For example, for the associated semantic class of query 108, server 102 ranks each analogous term provided for the associated semantic class by semantic class extractor 114. Server 102 maintains rankings for each analogous term in order of highest to lowest or lowest to highest ranking, or the like.

At 410, server 102 formulates requests. In an aspect, server 102 formulates requests associated with analogous terms. For example, server 102 ranks analogous terms and selects a top ranked subset of the analogous terms, and formulates requests where each request includes a unique analogous term of the top ranked subset of the analogous terms. In another aspect, server 102 may formulate each request to include one or more analogous item descriptors, semantic class descriptors, surrounding text and/or n-grams associated with surrounding text, or the like.

At 412, server 102 minimizes a semantic gap in the formulated requests. For example, before or after requests are formulated, server 102 identifies terms, n-grams, or the like, that result in a semantic gap between the text and image domains. Server 102 may employ heuristics, known term mappings, or other methods, to identify terms related to surrounding text, semantic class(es), analogous items, or other, that may result in a sementic gap. Server 102 may replace, modify or remove terms, words, descriptors, n-grams or the like, to minimize semantic gap. For example, server 102 may replace, modify or remove terms in formulated requests to reduce or minimize the semantic gap between text and image domains.

At 414, server 102 obtains web images. For example, server 102 may obtain web images using each of the formulated requests. In an aspect, server 102 uses the formulated requests to obtain web images online, for example, from commercial image search engine(s) 116, as shown in FIG. 1. Server 102 also obtains and maintains the associated surrounding text of each of the web images. Server 102 may also rank the web images. For example, server 102 may rank web images associated with each request for each associated semantic class. Server 102 may maintain the rankings for the associated web images. Server 102 may use a variety of criteria to rank the web images. In one aspect, server 102 may rank web images based on their relevance to their associated formulated request. In another aspect, server 102 ranks web images based on a number of available near-duplicate images for each web image.

At 416, server 102 obtains near-duplicate images. In an aspect, server 102 obtains near-duplicate images for each of a top ranked subset of the web images. In another aspect, server 102 obtains (e.g., online) near-duplicate images (and their associated surrounding text) associated with each semantic class of the query from near-duplicate image generator 118 for each of a top ranked of the web images corresponding to an associated formulated request. For example, if N web images are obtained for a given formulated request, server 102 ranks the N web images and selects the top M ranked subset of the web images (M≤N). Server 102 then obtains near-duplicate images associated with each of the M web images. Server 102 may maintain a relationship between each web image and its associated near-duplicate images, the associated formulated request and the associated semantic class of each web image.

At 418, server 102 determines high-quality representative text. In an aspect, server 102 uses high-quality text determination module 222, as described above, to determine the high-quality representative text. Various methods such as chi-squared, term frequency, or the like, as described herein, may be used to determine the high-quality representative text from the associated surrounding text of images. Server 102 may exploit techniques to remove stop words and low frequency terms before determining the representative text. Server 102 may determine representative text that best represent each semantic class of a query rapidly, as part of an online text to image translation process, using associated surrounding text of images obtained in response to receiving query 108. For example, server 102 may obtain semantic classes and analogous terms for query 108, web images and associated near-duplicate images after receiving query 108. Additionally, server 102 may obtain semantic classes and analogous terms for query 108, web images and/or associated near-duplicate images online as part of a real time online query to image translation response process.

Server 102 may represent near-duplicate images having surrounding text associated with the high-quality representative text by the part or the parts of the high-quality representative text. For example, server 102 may represent each near-duplicate image directly using representative textual terms or their representations. Server 102 may map high-quality representative textual term(s) to each near-duplicate image based on the associated surrounding text of the near-duplicate image. In another aspect, all or part of the surrounding text of corresponding images may be replaced with representative text. Therefore, certain images may be represented by one or more representative textual features, while other images may have little or no high-quality textual representation. Representing associated images by one or more high-quality representative textual features reduces the size and/or dimensionality of the textual domain of associated images.

At 420, at least one query-dependent classifier is trained. For example, server 102 may train a query-dependent classifier using the high-quality text of associated images to determine if an image belongs to one semantic class, another semantic class, or none of the semantic classes of the query. In this manner, one or more query-dependent classifiers may be utilized to remove "noisy" images from one or more image sets. Server 102 may also train multiple query-dependent classifiers for queries having more than two classes. Server 102 may train one or more query-dependent classifiers rapidly as part of a real time online query to image translation process by exploiting the lower dimensionality of the high-quality representative text. For example, server 102 trains one or more query-dependent classifiers after query 108 is submitted while a submitter of query 108 is waiting for query response 104 (i.e., an image response to query 108).

At 422, server 102 creates denoised image sets. For example, server 102 employs the one or more query-dependent classifiers to correct any improper image to semantic class relationship and to remove noisy images not associated with at least one of the semantic classes of query 108. In this example, each denoised image set includes images that are representative of an associated semantic class of query 108. Therefore, server 102 may create a denoised image set for each semantic class of query 108.

At 424, server 102 selects at least one representative image from each denoised image set as an image answer for the search query. For example, server 102 may rank the images in each denoised image set based in part on a relevance score that measures an alignment or similarity of each image with its corresponding semantic class and/or a confidence score proportional to a number of nearest neighbors associated with each image. Server 102 may further rank images using a scoring function, such as the scoring function of equation (2), shown above. Server 102 may maintain the ranking of images in each denoised image set. Server 102 may select a top ranked subset of images from each denoised image set as an image answer for each semantic class of query 108. At 426, for example, server 102 provides the image answer online in response to query 108 as query response 104.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, technologies and/or techniques described herein are applicable to applications other than text to image translation, such as foreign language to image translation, query to semantic class translation, textual query to textual query response translation, determination of high-quality text for other applications, image representation mixed with textual and visual features, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
under control of one or more processors configured with executable instructions:
receiving a search query;
determining one or more semantic classes applicable to the search query;
identifying multiple terms that are (i) analogous to one another and (ii) within one or more of the semantic classes;
obtaining web images corresponding to at least a subset of the multiple terms;
obtaining near-duplicate images of a subset of the web images associated with the one or more semantic classes;
removing noisy images from the near-duplicate images to create a denoised image set;
determining representative text associated with the denoised image set;
based at least in part on the representative text associated with the denoised image set, selecting at least one representative image for the one or more semantic classes;
training at least one query-dependent classifier based at least in part on the representative text;
employing the at least one query-dependent classifier to create the denoised image set for individual ones of the semantic classes; and
selecting the at least one representative image from the denoised image set as an image answer for the search query.

2. The method of claim 1, the method further comprising determining the subset of the multiple terms associated with the one or more semantic classes based at least in part on:
ranking the multiple terms based at least in part on a relevance to an associated one of the semantic classes; and
selecting the subset of the multiple terms based at least in part on the ranking the multiple terms.

3. The method of claim 2, wherein obtaining the web images comprises:
formulating requests, individual ones of the formulated requests having a unique analogous term of the subset of the multiple terms; and
submitting the formulated requests to one or more search engines to obtain the web images.

4. The method of claim 1, the method further comprising determining the subset of the web images associated with the one or more semantic classes by:
ranking the web images associated with a corresponding one of the one or more semantic classes; and
selecting the subset of the web images for the one or more semantic classes based on the ranking the web images.

5. The method of claim 4, the method further comprising determining a number of the near-duplicate images available for individual ones of the web images, wherein ranking the web images is based at least in part on:
the number of the near-duplicate images associated with individual ones of the web images; and
an analysis of text associated with individual ones of the web images.

6. The method of claim 1, the method further comprising:
compiling text of the near-duplicate images associated with the one or more semantic classes into a corresponding training document;
removing stop words from the training document; and
removing terms having a frequency of occurrence that is less than a predetermined threshold from the training document.

7. The method of claim 6, further comprising:
analyzing the text using at least one of a chi-squared scheme, a term frequency-inverse document frequency (td-idf) scheme or a term frequency scheme to weight textual features in the training document; and
selecting the representative text based at least in part on the weight associated with the textual features in the training document.

8. The method of claim 1, wherein selecting the at least one representative image comprises:
ranking images of the denoised image set based at least in part on a relevance score that measures a similarity of individual ones of the images with an associated semantic class and a confidence score proportional to a number of nearest neighbors associated with individual ones of the images; and
selecting the at least one representative image from the denoised image set based at least in part on the ranking.

9. A system comprising:
memory;
one or more processors communicatively coupled to the memory; and
instructions stored on the memory and when executed by the one or more processors, the instructions configure the system to:
obtain semantic classes for a search query;
identifying multiple terms that are (i) analogous to one another and (ii) within one or more of the semantic classes;
collect web based images associated with a subset of the multiple terms;
obtain near-duplicate images for a subset of the web based images;
remove noisy images from the near-duplicate images to create a denoised image set;

based at least in part on representative text associated with the denoised image set, select at least one representative image for individual ones of the semantic classes;

train at least one query-dependent classifier or multiple one-on-one query-dependent classifiers based at least in part on representative text associated with the near-duplicate images;

employ the at least one query-dependent classifier or multiple one-on-one query-dependent classifiers to create the denoised image set for individual ones of the one or more semantic classes;

use a scoring function to rank images in the denoised image set based at least in part on a relevance score that measures a similarity of individual images of an associated denoised image set with its corresponding semantic class, and a confidence score proportional to a number of nearest neighbors associated with individual ones of the images of an associated denoised image set; and determine at least one representative image from the denoised image set as an image answer for the search query based at least in part on the rank of the individual images in the denoised image set.

10. The system of claim 9, wherein the instructions further configure the system to:
determine the subset of the multiple terms associated with a corresponding one of the semantic classes by ranking the multiple terms based at least in part on a relevance to the corresponding one of the semantic classes; and
select the subset of the multiple terms based at least in part on the ranking the multiple terms.

11. The system of claim 9, wherein the instructions further configure the system to determine a number of available near-duplicate images associated with individual ones of the web based images.

12. The system of claim 11, wherein the instructions further configure the system to rank the web based images based at least in part on the number of the available near-duplicate images associated with individual ones of the web images.

13. The system of claim 12, wherein the instructions further configure the system to determine the subset of the web based images based of the rank of the web based images.

14. The system of claim 9, wherein the instructions further configure the system to format the web based images based at least in part on one or more image features of the web based images.

15. The system of claim 14, wherein the instructions further configure the system to obtain the near-duplicate images for the subset of the web based images having the format.

16. The system of claim 9, wherein the instructions further configure the system to:
determine the representative text based at least in part on an analysis of surrounding text associated with the near-duplicate images;
analyze terms in the requests to identify terms that result in a semantic gap between text and image domains; and
replace, modify or remove identified terms in the requests to reduce the semantic gap.

17. The system of claim 9, wherein the relevance score measures the similarity based at least in part on a cosine similarity between the representative text of individual ones of the images of the denoised image set and a corresponding one of the semantic classes.

18. A method comprising:
determining semantic classes of one or more terms of a query;
identifying multiple terms that are (i) analogous to one another and (ii) within one or more of the semantic classes;
for each of the semantic classes of the query:
obtaining web images corresponding to a subset of the multiple terms associated with a corresponding semantic class;
obtaining near-duplicate images for a subset of the web images;
removing noisy images from the near-duplicate images to create a denoised image set;
determining representative text associated with images of the denoised image set;
based at least in part on representative text associated with the denoised image set, selecting at least one representative image for individual ones of the of the semantic classes as an image answer;
training at least one query-dependent classifier based at least in part on the representative text;
employing the at least one query-dependent classifier to create the denoised image set for individual ones of the semantic classes; and
selecting the at least one representative image from the denoised image set as an image answer for the search query.

19. The system of claim 18, the method further comprising providing the image answer in response to the search query.

* * * * *